(12) United States Patent
Badenhorst et al.

(10) Patent No.: US 7,627,517 B2
(45) Date of Patent: Dec. 1, 2009

(54) METHOD AND SYSTEM FOR PROVIDING CONFIGURABLE FEATURES FOR GRAPHICAL USER INTERFACES FOR ELECTRONIC TRADING

(75) Inventors: Abrie J. Badenhorst, Chicago, IL (US); James C. Downs, Chicago, IL (US)

(73) Assignee: Rosenthal Collins Group, LLC, Chicago, IL (US)

( * ) Notice: Subject to any disclaimer, the term of this patent is extended or adjusted under 35 U.S.C. 154(b) by 382 days.

(21) Appl. No.: 11/295,313

(22) Filed: Dec. 6, 2005

(65) Prior Publication Data

US 2006/0129475 A1  Jun. 15, 2006

Related U.S. Application Data

(60) Provisional application No. 60/634,463, filed on Dec. 9, 2004.

(51) Int. Cl.
*G06Q 40/00* (2006.01)
(52) U.S. Cl. ......................... 705/37; 345/619
(58) Field of Classification Search ............. 705/37–44; 345/619
See application file for complete search history.

(56) References Cited

U.S. PATENT DOCUMENTS

| | | | |
|---|---|---|---|
| 5,038,284 A | | 8/1991 | Kramer |
| 5,412,769 A | | 5/1995 | Maruoka et al. |
| 5,555,357 A | * | 9/1996 | Fernandes et al. ............ 345/441 |
| 5,600,346 A | * | 2/1997 | Kamata et al. ............... 715/807 |
| 5,704,050 A | * | 12/1997 | Redpath ...................... 715/764 |
| 5,796,402 A | * | 8/1998 | Ellison-Taylor .............. 715/792 |
| 5,801,699 A | * | 9/1998 | Hocker et al. ................ 715/837 |
| 5,835,090 A | * | 11/1998 | Clark et al. .................. 715/764 |
| 5,915,245 A | | 6/1999 | Patterson |
| 5,924,083 A | | 7/1999 | Silverman et al. |
| 5,977,973 A | * | 11/1999 | Sobeski et al. ............... 715/798 |
| 6,058,378 A | | 5/2000 | Clark et al. |
| 6,088,027 A | * | 7/2000 | Konar et al. ................. 715/858 |
| 6,625,583 B1 | | 9/2003 | Silverman |
| 6,766,304 B2 | | 7/2004 | Kemp et al. |
| 6,772,132 B1 | | 8/2004 | Kemp, II |
| 6,938,011 B1 | | 8/2005 | Kemp, II |
| 6,993,504 B1 | | 1/2006 | Friesen |
| 7,020,626 B1 | | 3/2006 | Eng et al. |
| 7,113,924 B2 | | 9/2006 | Fishbain |

(Continued)

OTHER PUBLICATIONS

GL Trade, Liffe Connect for Futures, User Guide, V 4.50 Beta, Jan. 1999.

(Continued)

*Primary Examiner*—Hani Kazimi
*Assistant Examiner*—Olabode Akintola
(74) *Attorney, Agent, or Firm*—Lesavich High-Tech Law Group, P.C.; Stephen Lesavich

(57) ABSTRACT

A method and system for providing configurable features for a multi-windowed graphical user interface (GUI) for electronic trading. The configurable features include, but are not limited to, creating collective windows comprising plural individual windows, where the collective window functions like an individual window, collapsing plural windows with a single action and changing display characteristics of the plural windows or the collective windows. The method and system allows a user of a target device to customize the multi-windowed GUI based on individual user preferences for electronic trading.

29 Claims, 25 Drawing Sheets

U.S. PATENT DOCUMENTS

| | | |
|---|---|---|
| 7,117,450 B1 * | 10/2006 | Chaudhri .................... 715/787 |
| 7,124,110 B1 | 10/2006 | Kemp, II |
| 7,127,424 B2 | 10/2006 | Kemp, II |
| 7,146,336 B2 * | 12/2006 | Olsen et al. .................... 705/37 |
| 7,212,999 B2 | 5/2007 | Friesen et al. |
| 7,218,325 B1 | 5/2007 | Buck |
| 7,228,289 B2 | 6/2007 | Brumfield et al. |
| 7,243,083 B2 | 7/2007 | Burns et al. |
| 7,348,981 B1 | 3/2008 | Buck |
| 7,366,691 B1 | 4/2008 | Kemp, II |
| 7,373,327 B1 | 5/2008 | Kemp, II |
| 7,389,258 B2 | 6/2008 | Brumfield |
| 7,389,264 B2 | 6/2008 | Kemp, II |
| 7,389,268 B1 | 6/2008 | Kemp, II |
| 7,392,219 B2 | 6/2008 | Singer |
| 7,403,921 B2 | 7/2008 | Tanpoco |
| 7,412,416 B2 | 8/2008 | Friesen |
| 7,418,422 B2 | 8/2008 | Burns |
| 7,426,490 B1 | 9/2008 | Borsand |
| 7,426,491 B1 | 9/2008 | Singer |
| 7,447,655 B2 | 11/2008 | Brumfield |
| 7,454,382 B1 | 11/2008 | Triplett |
| 7,461,026 B2 | 12/2008 | Schluetter |
| 2001/0032097 A1 | 10/2001 | Levey |
| 2002/0026401 A1 | 2/2002 | Hueler |
| 2002/0035534 A1 | 3/2002 | Buist et al. |
| 2002/0049666 A1 | 4/2002 | Reuter |
| 2002/0052836 A1 | 5/2002 | Galperin et al. |
| 2002/0102217 A1 | 5/2002 | Burns et al. |
| 2002/0156718 A1 | 10/2002 | Olsen et al. |
| 2003/0009419 A1 | 1/2003 | Chavez et al. |
| 2003/0023542 A1 | 1/2003 | Kemp et al. |
| 2003/0055737 A1 | 3/2003 | Pope et al. |
| 2003/0088495 A1 | 5/2003 | Gilbert et al. |
| 2003/0093351 A1 | 5/2003 | Sarabanchong |
| 2003/0120591 A1 | 6/2003 | Birkhead et al. |
| 2003/0126069 A1 | 7/2003 | Cha |
| 2003/0200167 A1 | 10/2003 | Kemp |
| 2003/0225648 A1 | 12/2003 | Hylton |
| 2004/0066414 A1 | 4/2004 | Czerwinski et al. |
| 2004/0093300 A1 | 5/2004 | Burns |
| 2004/0103054 A1 | 5/2004 | Singer |
| 2004/0143542 A1 * | 7/2004 | Magill et al. .................... 705/37 |
| 2004/0148242 A1 | 7/2004 | Liu |
| 2004/0193526 A1 | 9/2004 | Singer |
| 2004/0210514 A1 | 10/2004 | Kemp |
| 2004/0210847 A1 * | 10/2004 | Berson et al. ................ 715/788 |
| 2005/0015323 A1 | 1/2005 | Myr |
| 2005/0075966 A1 | 4/2005 | Duka |
| 2005/0097026 A1 | 5/2005 | Morano |
| 2005/0102217 A1 | 5/2005 | Burns |
| 2005/0125327 A1 | 6/2005 | Fishbain |
| 2005/0144112 A1 | 6/2005 | Singer |
| 2005/0149429 A1 | 7/2005 | Kemp |
| 2005/0154668 A1 | 7/2005 | Burns |
| 2005/0187858 A1 | 8/2005 | Graham |
| 2005/0188329 A1 * | 8/2005 | Cutler et al. ................. 715/804 |
| 2005/0192887 A1 | 9/2005 | Triplett |
| 2005/0192920 A1 * | 9/2005 | Hodge et al. .................... 707/1 |
| 2005/0203825 A1 | 9/2005 | Angle et al. |
| 2005/0251475 A1 | 11/2005 | Sato |
| 2005/0272812 A1 | 12/2005 | Pettegrew et al. |
| 2005/0273408 A1 | 12/2005 | Bandman et al. |
| 2005/0273421 A1 | 12/2005 | Rosenthal et al. |
| 2005/0278237 A1 | 12/2005 | Dankovchik et al. |
| 2005/0283422 A1 | 12/2005 | Myr |
| 2006/0010066 A1 | 1/2006 | Rosenthal et al. |
| 2006/0015436 A1 | 1/2006 | Burns |
| 2006/0037038 A1 | 2/2006 | Buck |
| 2006/0080223 A1 | 4/2006 | Rosenthal et al. |
| 2006/0085320 A1 | 4/2006 | Owens |
| 2006/0085741 A1 | 4/2006 | Weiner |
| 2006/0088614 A1 | 4/2006 | Pettegrew et al. |
| 2006/0129446 A1 | 6/2006 | Ruhl et al. |
| 2006/0129475 A1 | 6/2006 | Badenhorst et al. |
| 2006/0149654 A1 | 7/2006 | Burns |
| 2006/0167781 A1 | 7/2006 | Kemp |
| 2006/0195387 A1 | 8/2006 | Kemp |
| 2006/0195388 A1 | 8/2006 | Kemp |
| 2006/0195389 A1 | 8/2006 | Kemp |
| 2006/0200405 A1 | 9/2006 | Burns |
| 2006/0235787 A1 | 10/2006 | Burns et al. |
| 2006/0247997 A1 | 11/2006 | West |
| 2006/0253373 A1 | 11/2006 | Rosenthal et al. |
| 2006/0253377 A1 | 11/2006 | Burns |
| 2006/0259382 A1 | 11/2006 | Kemp |
| 2006/0259383 A1 | 11/2006 | Kemp |
| 2006/0259384 A1 | 11/2006 | Schluetter |
| 2006/0259395 A1 | 11/2006 | Burns |
| 2006/0259396 A1 | 11/2006 | Burns |
| 2006/0259397 A1 | 11/2006 | Schluetter |
| 2006/0259398 A1 | 11/2006 | Singer |
| 2006/0259400 A1 | 11/2006 | Monroe |
| 2006/0259401 A1 | 11/2006 | West |
| 2006/0259402 A1 | 11/2006 | West |
| 2006/0259403 A1 | 11/2006 | Monroe |
| 2006/0259404 A1 | 11/2006 | Brumfield |
| 2006/0259405 A1 | 11/2006 | Friesen |
| 2006/0259406 A1 | 11/2006 | Kemp |
| 2006/0259407 A1 | 11/2006 | Rosenthal et al. |
| 2006/0259409 A1 | 11/2006 | Burns |
| 2006/0259410 A1 | 11/2006 | Friesen |
| 2006/0259411 A1 | 11/2006 | Burns |
| 2006/0259412 A1 | 11/2006 | Kemp |
| 2006/0259413 A1 | 11/2006 | Friesen |
| 2006/0259414 A1 | 11/2006 | Singer |
| 2006/0265239 A1 | 11/2006 | Schluetter |
| 2006/0265240 A1 | 11/2006 | Schluetter |
| 2006/0265303 A1 | 11/2006 | Kemp |
| 2006/0265304 A1 | 11/2006 | Brumfield |
| 2006/0265305 A1 | 11/2006 | Schluetter |
| 2006/0265314 A1 | 11/2006 | Singer |
| 2006/0265315 A1 | 11/2006 | Friesen |
| 2006/0265316 A1 | 11/2006 | Brumfield |
| 2006/0265318 A1 | 11/2006 | Friesen |
| 2006/0265319 A1 | 11/2006 | Friesen |
| 2006/0265320 A1 | 11/2006 | Duquette |
| 2006/0265321 A1 | 11/2006 | Brumfield |
| 2006/0265322 A1 | 11/2006 | Burns |
| 2006/0265651 A1 | 11/2006 | Buck |
| 2006/0271468 A1 | 11/2006 | Rosenthal et al. |
| 2006/0271475 A1 | 11/2006 | Brumfield |
| 2006/0277136 A1 | 12/2006 | O'Connor |
| 2006/0287944 A1 | 12/2006 | Fishbain |
| 2006/0292547 A1 | 12/2006 | Pettegrew et al. |
| 2006/0293997 A1 | 12/2006 | Tanpoco |
| 2006/0293999 A1 | 12/2006 | Tanpoco |
| 2007/0038554 A1 | 2/2007 | Kemp |
| 2007/0038555 A1 | 2/2007 | Kemp |
| 2007/0038556 A1 | 2/2007 | Kemp |
| 2007/0038557 A1 | 2/2007 | Kemp |
| 2007/0078749 A1 | 4/2007 | Burns |
| 2007/0078752 A1 | 4/2007 | Burns |
| 2007/0100735 A1 | 5/2007 | Kemp |
| 2007/0100736 A1 | 5/2007 | Singer |
| 2007/0106590 A1 | 5/2007 | Triplett |
| 2007/0112665 A1 | 5/2007 | Mackey et al. |
| 2007/0156565 A1 | 7/2007 | Singer |
| 2007/0156570 A1 | 7/2007 | Singer |
| 2007/0294157 A1 | 12/2007 | Singla et al. |
| 2008/0097887 A1 | 4/2008 | Duquette |
| 2008/0129735 A1 | 6/2008 | Buck |
| 2008/0162324 A1 | 7/2008 | West |
| 2008/0162333 A1 | 7/2008 | Kemp |

| | | |
|---|---|---|
| 2008/0243709 A1 | 10/2008 | Mintz |
| 2008/0243710 A1 | 10/2008 | Borts |
| 2008/0281669 A1 | 11/2008 | Pratt |

OTHER PUBLICATIONS

System for Buying and Selling Futures and Options Transaction Terminal Operational Guidelines, Tokyo Stock Exchange, 1999.

Static Price Axis for Electronic Trading, Wit Capital Group, Digital Stock Market, Graphical User Interface Negotiations Design Document, Oct. 13, 1998, pp. 63-64.

Electronic Trading Platforms Special Report, Jeremy Carter, Risk Magazine, Nov. 1999.

Memorandum Opinion and Order of Federal Judge James B. Moran, Case No. 04 C 5312, *Trading Technologies International Inc.* v. *eSpeed Inc., eSpeed International Ltd., and Ecco Ware, Ltd.* Jun. 20, 2007 (N. D. Ill) including claim constructions for U.S. Patent Nos. 6,766,304 and 6,882,132.

Partial PCT Search Report PCT/US2006/043,726 WO 2007/056,553.

Partial PCT Search Report PCT/US2006/021,052 WO 2006/130,650.

International Search Report for PCT/US2005/039,563.

International Search Report for PCT/US2005/024,590.

International Search Report for PCT/US2005/020,035.

Jun. 17, 2008, Partial PCT Search Report—PCT/US2006/038,612.

Jun. 11, 2008, Partial PCT Search Report—PCT/US2006/016,792.

\* cited by examiner

FIG. 7

| Controls | | | State | Acco... | Orde... | Instrument | Si... | Qty | Price | Type | Avg Px |
|---|---|---|---|---|---|---|---|---|---|---|---|
| HIST | CXL | AMND | Rejected | APIDEV5 | 189111 | CME \ MINI S&P \... | Buy | 1 | 1223.50 | Limit | 0 |
| HIST | CXL | AMND | Working | APIDEV5 | 189110 | CME \ MINI S&P \... | Buy | 1 | 1213.25 | Limit | 0 |
| HIST | CXL | AMND | Working | APIDEV5 | 189109 | CME \ MINI NSDQ... | Buy | 1 | 1524.50 | Limit | 0 |
| HIST | CXL | AMND | Held Order | APIDEV5 | S3 | CME \ MINI NSDQ... | Buy | 1 | 1533.50 | Stop# | 0 |
| HIST | CXL | AMND | Filled | APIDEV5 | 189106 | CME \ MINI NSDQ... | Buy | 1 | 1534.50 | Limit | 1528 |
| HIST | CXL | AMND | Held Order | APIDEV5 | S2 | CME \ MINI NSDQ... | Sell | 1 | 1512.50 | Stop# | 0 |
| HIST | CXL | AMND | Filled | APIDEV5 | 188105 | CME \ MINI S&P \... | Buy | 1 | 1224.50 | Limit | 1224.5 |
| HIST | CXL | AMND | Working | APIDEV5 | 189085 | CME \ MINI NSDQ... | Sell | 2 | 1531.50 | Limit | 0 |
| HIST | CXL | AMND | Filled | APIDEV5 | 189086 | CME \ MINI NSDQ... | Sell | 1 | 0.00 | Market | 1525.5 |
| HIST | CXL | AMND | Filled | APIDEV5 | 188065 | CME \ MINI NSDQ... | Buy | 2 | 1525.50 | Limit | 1525.5 |
| HIST | CXL | AMND | Working | APIDEV5 | 189090 | CME \ MINI S&P \... | Buy | 1 | 1212.00 | Limit | 0 |
| HIST | CXL | AMND | Filled | APIDEV5 | 189091 | CME \ MINI S&P S... | Buy | 2 | 0.00 | Market | 4.5 |
| HIST | CXL | AMND | Rejected | APIDEV5 | 188475 | CME \ MINI NSDQ... | Buy | 1 | 1534.50 | StopLimit | 0 |
| HIST | CXL | AMND | Filled | APIDEV5 | 188107 | CME \ MINI NSDQ... | Sell | 1 | 1527.50 | Limit | 1532.5 |
| HIST | CXL | AMND | Filled | APIDEV5 | 188106 | CME \ MINI S&P \... | Buy | 2 | 1221.75 | Limit | 1221.75 |
| HIST | CXL | AMND | Filled | APIDEV5 | 188478 | CME \ MINI S&P \... | Buy | 5 | 1221.75 | Limit | 1221 |
| HIST | CXL | AMND | Rejected | APIDEV5 | 188476 | CME \ MINI NSDQ... | Sell | 1 | 1532.00 | StopLimit | 0 |
| HIST | CXL | AMND | Filled | APIDEV5 | 188109 | CME \ MINI NSDQ... | Buy | 1 | 1530.00 | Limit | 1530 |
| HIST | CXL | AMND | Filled | APIDEV5 | 188108 | CME \ MINI NSDQ... | Buy | 1 | 1532.50 | Limit | 1532.5 |
| HIST | CXL | AMND | Filled | APIDEV5 | 188110 | CME \ MINI NSDQ... | Buy | 1 | 1541.00 | Limit | 1533 |
| HIST | CXL | AMND | Filled | APIDEV5 | 188111 | CME \ MINI NSDQ... | Sell | 1 | 0.00 | Market | 1532.5 |

FIG. 8

| Control | Account | Order ID | Instrument | Side | Fill Qty | Fill ID | Price |
|---|---|---|---|---|---|---|---|
| REVERSE | APIMEG | 188242 | CME \ MINI S&P \ MAR05 | Buy | 1 | CME 1000009... | 1220.75 |
| REVERSE | APIMEG | 188241 | CME \ MINI NSDQ \ MAR... | Sell | 2 | CME 1000009... | 1533 |
| REVERSE | APIMEG | 188240 | CME \ MINI S&P \ MAR05 | Buy | 3 | CME 1000009... | 1220.75 |
| REVERSE | APIMEG | 188239 | CME \ MINI NSDQ \ MAR... | Buy | 5 | CME 1000009... | 1533.5 |
| REVERSE | APIMEG | 188238 | CME \ MINI NSDQ \ MAR... | Buy | 1 | CME 1000008... | 1533.5 |
| REVERSE | APIMEG | 188237 | CME \ MINI NSDQ \ MAR... | Buy | 1 | CME 1000008... | 1533.5 |
| REVERSE | APIMEG | 188236 | CME \ MINI NSDQ \ MAR... | Sell | 1 | CME 1000008... | 1533 |
| REVERSE | APIMEG | 188235 | CME \ MINI NSDQ \ MAR... | Sell | 6 | CME 1000007... | 1533 |
| REVERSE | APIMEG | 188144 | CME \ MINI NSDQ \ MAR... | Buy | 1 | CME 1000007... | 1533.5 |
| REVERSE | APIMEG | 188143 | CME \ MINI NSDQ \ MAR... | Buy | 2 | CME 1000007... | 1533.5 |
| REVERSE | APIMEG | 188142 | CME \ MINI NSDQ \ MAR... | Buy | 4 | CME 1000007... | 1533.5 |
| REVERSE | APIMEG | 188141 | CME \ MINI NSDQ \ MAR... | Sell | 1 | CME 1000007... | 1533 |
| REVERSE | APIMEG | 188140 | CME \ MINI NSDQ \ MAR... | Sell | 2 | CME 1000006... | 1533 |
| REVERSE | APIMEG | 188139 | CME \ MINI NSDQ \ MAR... | Buy | 4 | CME 1000006... | 1533.5 |

Orders Report (BETA)

User : APIDEV4
Account :
Dates : 3/1/2005 - 3/15/2005

| Account | Order ID | Instrument | Side | Quantity | Price | Order Type | Avg Price | State | Price2 | Filled | # Fills | Open |
|---|---|---|---|---|---|---|---|---|---|---|---|---|
| APIDEV4 | 100446 | CMEMINI S&PJUN05 | Buy | 2 | 1208.5 | Limit | 1206.5 | Filled | 0 | 2 | 1 | 0 |
| APIDEV4 | 100445 | CMEMINI NSDQMAR05 | Buy | 2 | 1509 | Limit | 1509 | Filled | 0 | 2 | 1 | 0 |
| APIDEV4 | 100447 | CMEMINI S&PJUN05 | Sell | 1 | 1208.25 | Limit | 0 | Working | 0 | 0 | 0 | 1 |
| APIDEV4 | S1 | CMEMINI NSDQJUN05 | Sell | 1 | 1514.5 | SynchStop | 0 | HeldOrder | 0 | 0 | 0 | 1 |
| APIDEV4 | 101505 | CMEMINI NSDQMAR05 | Buy | 1 | 10 | Limit | 0 | Sent | 0 | 0 | 0 | 1 |
| APIDEV4 | 101506 | CMEMINI NSDQJUN05 | Buy | 2 | 14 | Limit | 0 | Sent | 0 | 0 | 0 | 2 |
| APIDEV4 | 107185 | CMEMINI NSDQMAR05 | Buy | 2 | 1510 | Limit | 1503 | Filled | 0 | 2 | 1 | 0 |

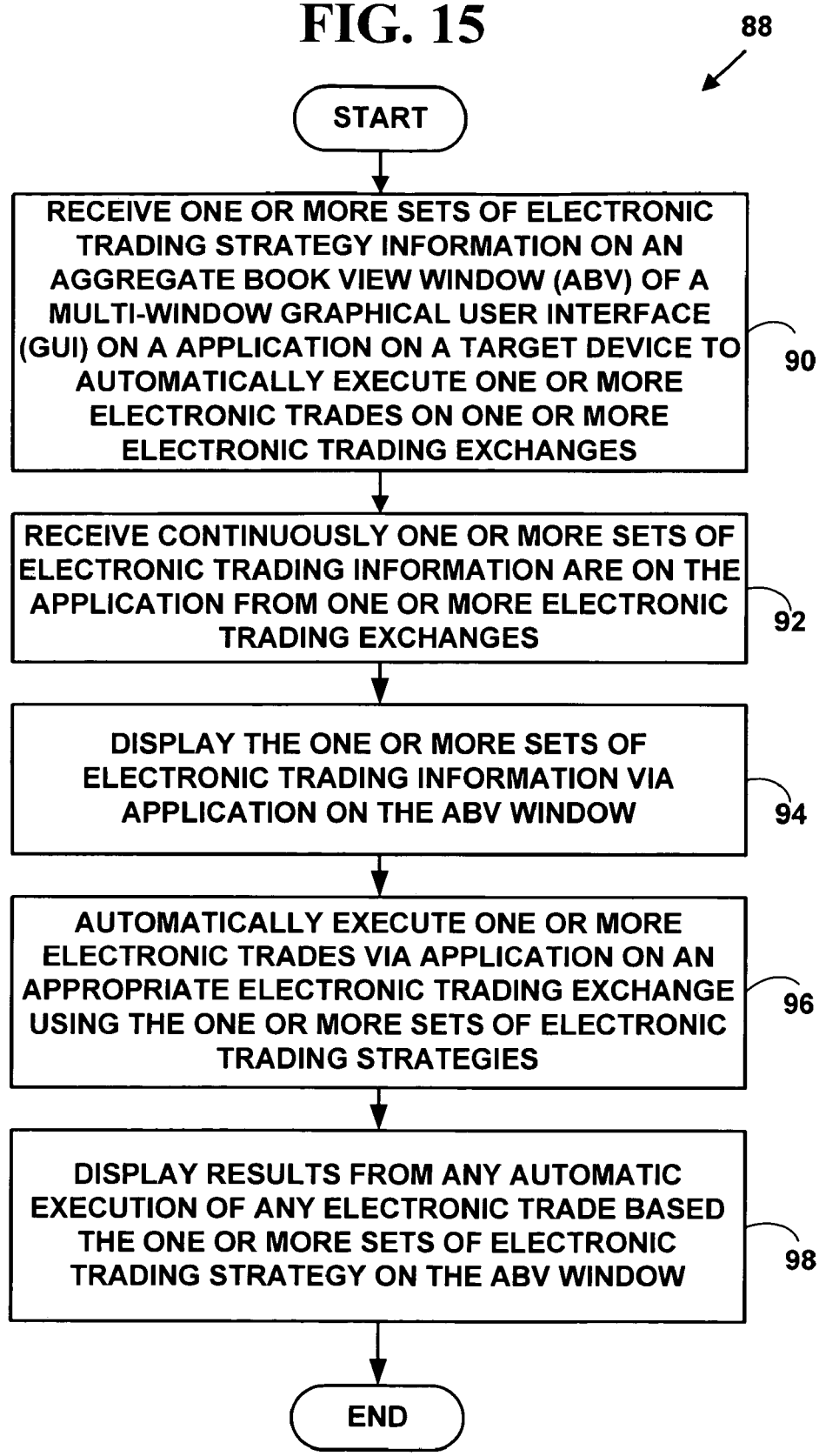

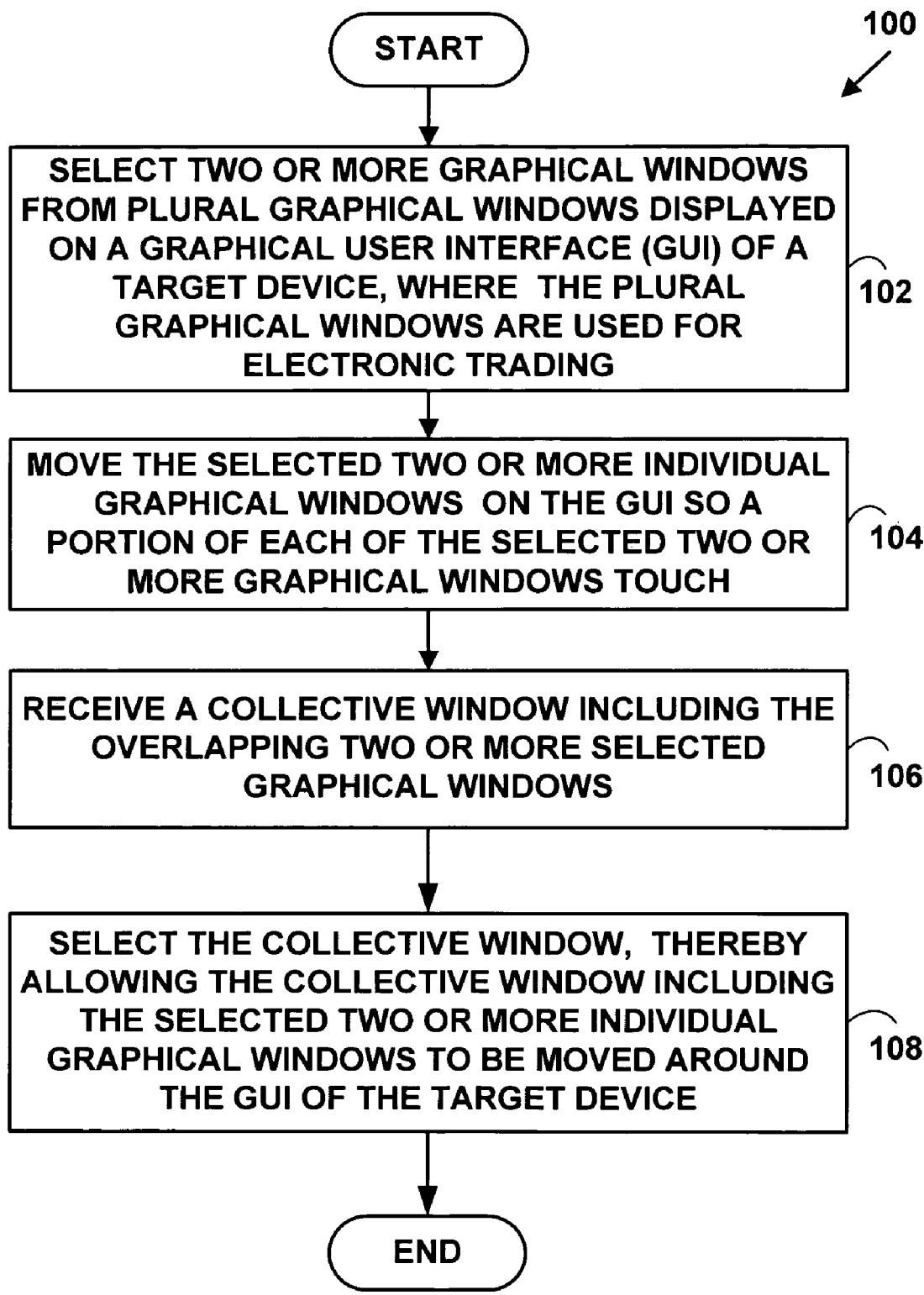

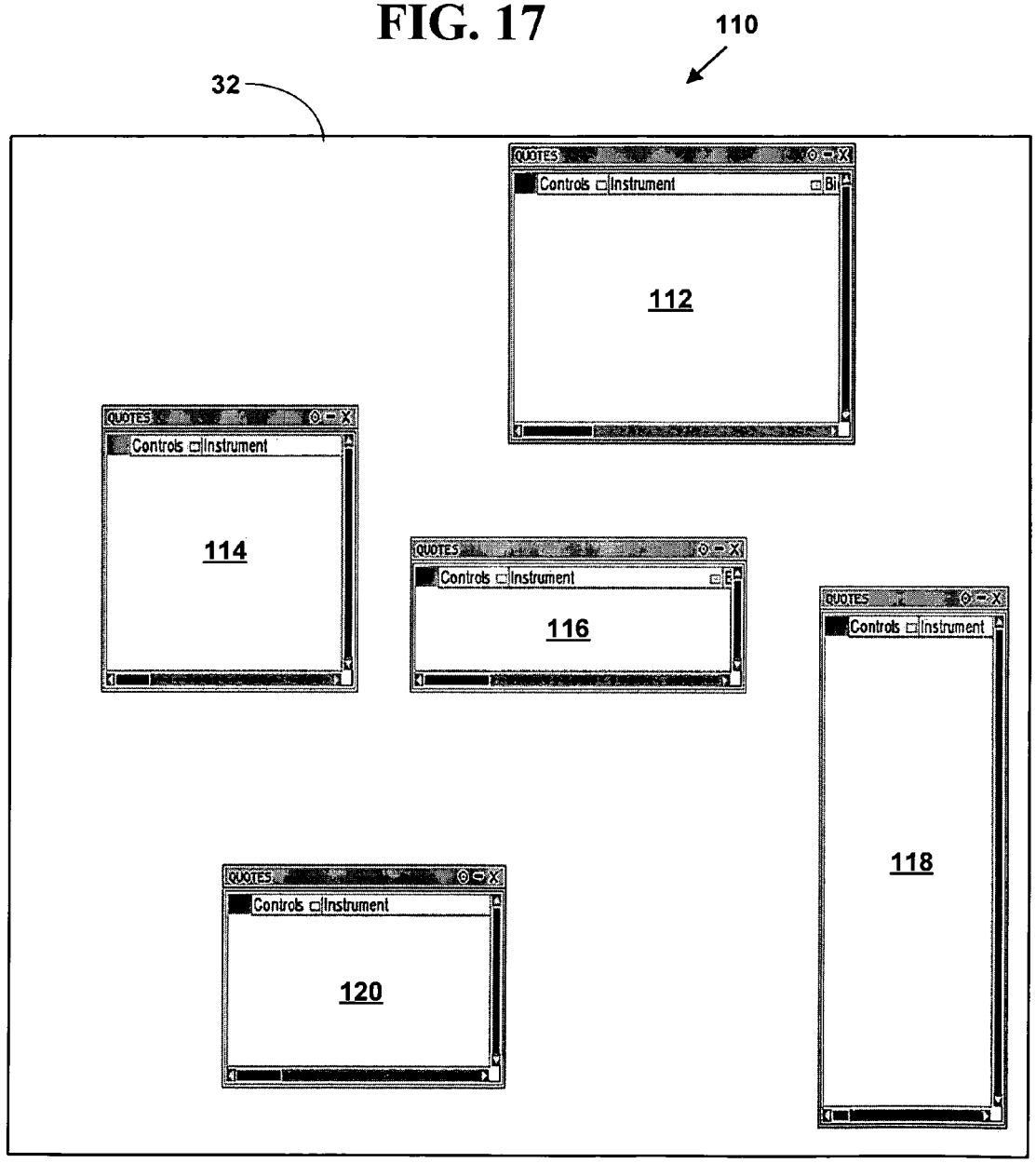

METHOD AND SYSTEM FOR PROVIDING CONFIGURABLE FEATURES FOR GRAPHICAL USER INTERFACES FOR ELECTRONIC TRADING

CROSS REFERENCES TO RELATED APPLICATIONS

This application claims priority to U.S. Provisional Patent Application No. 60/634,463, filed Dec. 9, 2004, the contents of which as incorporated by reference.

FIELD OF THE INVENTION

This invention relates to providing electronic information via a graphical user interface over a computer network. More specifically, it relates to a method and system for providing configurable features for a graphical user interface for electronic trading.

BACKGROUND OF THE INVENTION

The trading of stocks, bonds and other financial instruments over computer networks such as the Internet has become a very common activity. In many countries of the world, such stocks, bonds and other financial instruments are traded exclusively over computer networks, completely replacing prior trading systems such as "open outcry" trading in trading pits.

Trading of stocks, bonds, etc. typically requires multiple types of associated electronic information. For example, to trade stocks electronically an electronic trader typically would like to know an asking price for a stock, a current bid price for a stock, a bid quantity, an asking quantity, current information about the company the trader is trading such as profit/loss information, a current corporate forecast, current corporate earnings, etc.

For an electronic trader to be successful, the multiple types of associated electronic information has to be supplied in real-time to allow the electronic trader to make the appropriate decisions. Such electronic information is typically displayed in multiple windows on a display screen.

There are however a number of problems with displaying information necessary for electronic trading. One problem is that current Graphical User Interfaces (GUI) are proprietary and do not implement functionality that allow users to customize based on their preferences. Another problem is that current GUIs used for electronic trading systems don't allow adjustment of graphical windows used on GUIs. Another problem is that most electronic systems don't allow easy minimization or other manipulation, such as adjusting font size and display area of graphical windows used on GUIs.

There have been attempts to solve some of the problems with GUIs used for electronic trading. For example, U.S. Pat. No. 6,772,132 entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,766,304 entitled "Click based trading with intuitive grid display of market depth" that issued to Kemp et al. teaches "A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently."

U.S. Pat. No. 6,408,282 entitled "System and method for conducting securities transactions over a computer network" that issued to Buist teaches "The system and method of the preferred embodiment supports trading of securities over the Internet both on national exchanges and outside the national exchanges. The preferred embodiment supports an improved human interface and a continuous display of real-time stock quotes on the user's computer screen. The ergonomic graphical user interface (GUI) of the preferred embodiment includes several functional benefits in comparison with existing on-line consumer trading systems. In the preferred embodiment, the users are subscribers to a securities trading service offered over the Internet. Preferably, each subscriber to this service is simultaneously connected from his own computer to a first system which provides user-to-user trading capabilities and to a second system which is a broker/dealer system of his/her choice. The system providing the user-to-user trading services preferably includes a root server and a hierarchical network of replicated servers supporting replicated databases. The user-to-user system provides real-time continuously updated stock information and facilitates user-to-user trades that have been approved by the broker/dealer systems with which it interacts. Users of the preferred system can trade securities with other users of the system. As part of this user-to-user trading, a user can accept a buy or sell offer at the terms offered or he can initiate a counteroffer and negotiate a trade."

U.S. Pat. No. 5,297,031 entitled "Method and apparatus for order management by market brokers" that issued to Gutterman et al. teaches "There is provided a broker workstation for managing orders in a market for trading commodities, securities, securities options, futures contracts and futures options and other items including: a device for selectively displaying order information; a computer for receiving the orders and for controlling the displaying device; and a device for entering the orders into the computer; wherein the displaying device comprises a device for displaying selected order information about each incoming order, a device for displaying a representation of an order deck and a device for displaying a total of market orders. In another aspect of the invention, there is provided in a workstation having a computer, a device for entering order information into the computer and a device for displaying the order information entered, a method for managing orders in a market for trading commodities, securities, securities options, futures contracts and futures options and the like comprising the steps of: selectively displaying order information incoming to the workstation; accepting or rejecting orders corresponding to the incoming order information displayed; displaying accepted order information in a representation of a broker deck; and selectively displaying a total of orders at the market price."

Thus, it is desirable to solve some of the problems associated with using GUIs for electronic trading systems.

SUMMARY OF THE INVENTION

In accordance with preferred embodiments of the present invention, some of the problems associated with non-proprietary GUIs that provide electronic information for electronic trading systems. A method and system for providing configurable features for a multi-windowed graphical user interface for electronic trading is provided.

The configurable features include, but are not limited to, creating collective windows comprising plural individual windows, where the collective window functions like an individual window, collapsing plural windows with a single action and changing display characteristics of the plural windows or the collective windows The method and system allows a user of a target device to customize the multi-windowed GUI based on individual user preferences for electronic trading.

The foregoing and other features and advantages of preferred embodiments of the present invention is more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 7 is a block diagram of a screen shot of an exemplary order window;

FIG. 8 is a block diagram of a screen shot of an exemplary fill window;

FIG. 14 is a block diagram of a screen shot of an exemplary reports window;

FIG. 15 is a flow diagram illustrating a method for electronic trading;

FIG. 16 is a flow diagram illustrating a Method 88 for manipulating multiple windows;

FIG. 17 is a block diagram of a screen shoot illustrating plural individual graphical windows displayed on a graphical user interface;

DETAILED DESCRIPTION OF THE INVENTION

Exemplary Electronic Trading System

Figure 1:
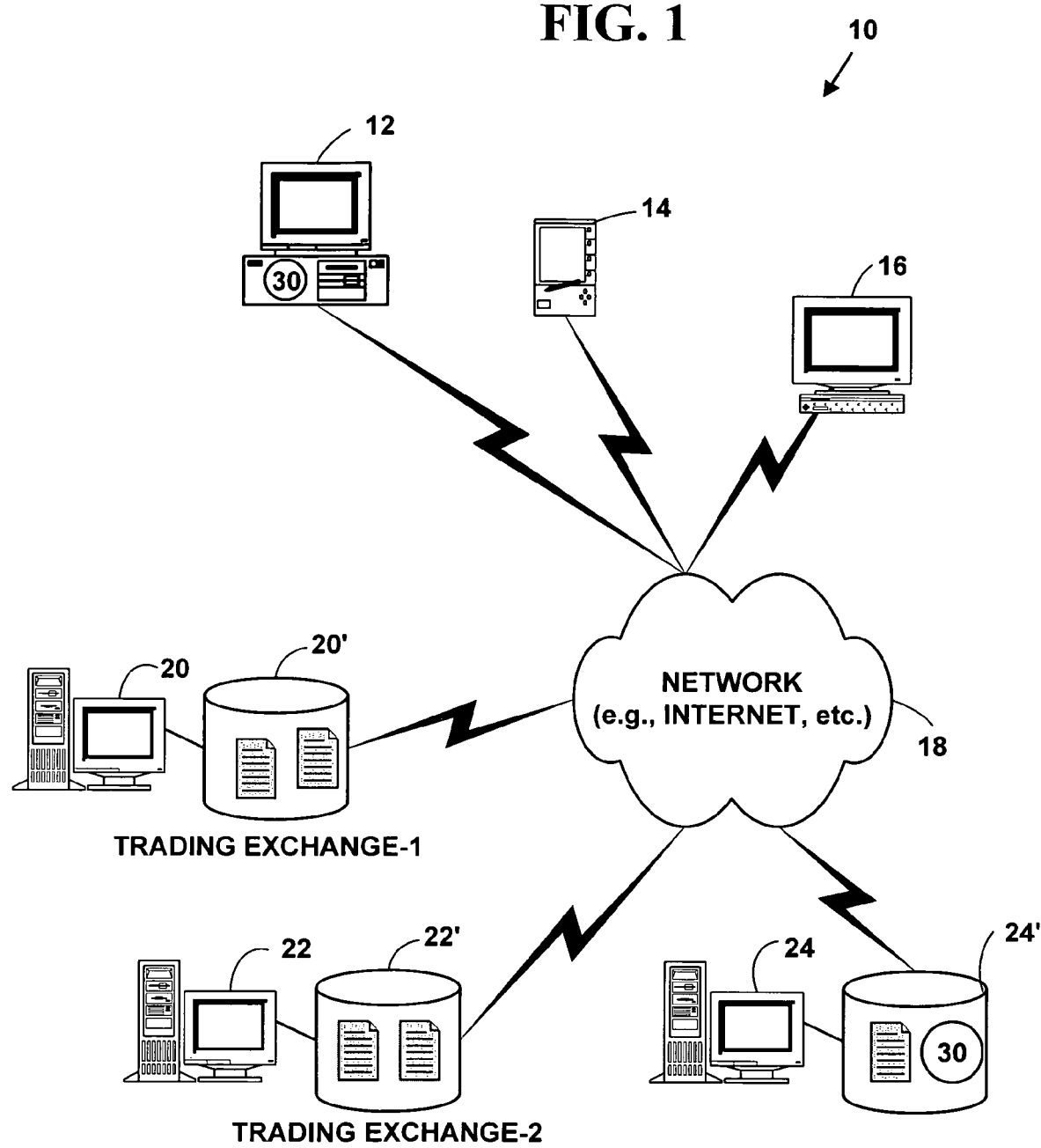
FIG. 1 is a block diagram illustrating an exemplary electronic trading system.

FIG. 1 is a block diagram illustrating an exemplary electronic trading system 10. The exemplary electronic information updating system 10 includes, but is not limited to, one or more target devices 12, 14, 16 (only three of which are illustrated). However, the present invention is not limited to these target electronic devices and more, fewer or others types of target electronic devices can also be used.

The target devices 12, 14, 16 are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for electronic trading exchanges, servers for electronic trading brokers, servers for electronic trading information providers, etc.

The one or more target devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer therefore support virtually any packet protocol.

The communications network 18 may include one or more servers and one or more web-sites accessible by users to send and receive information useable by the one or more computers 12. The one or more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

Exemplary Electronic Trading Display System

Figure 2:
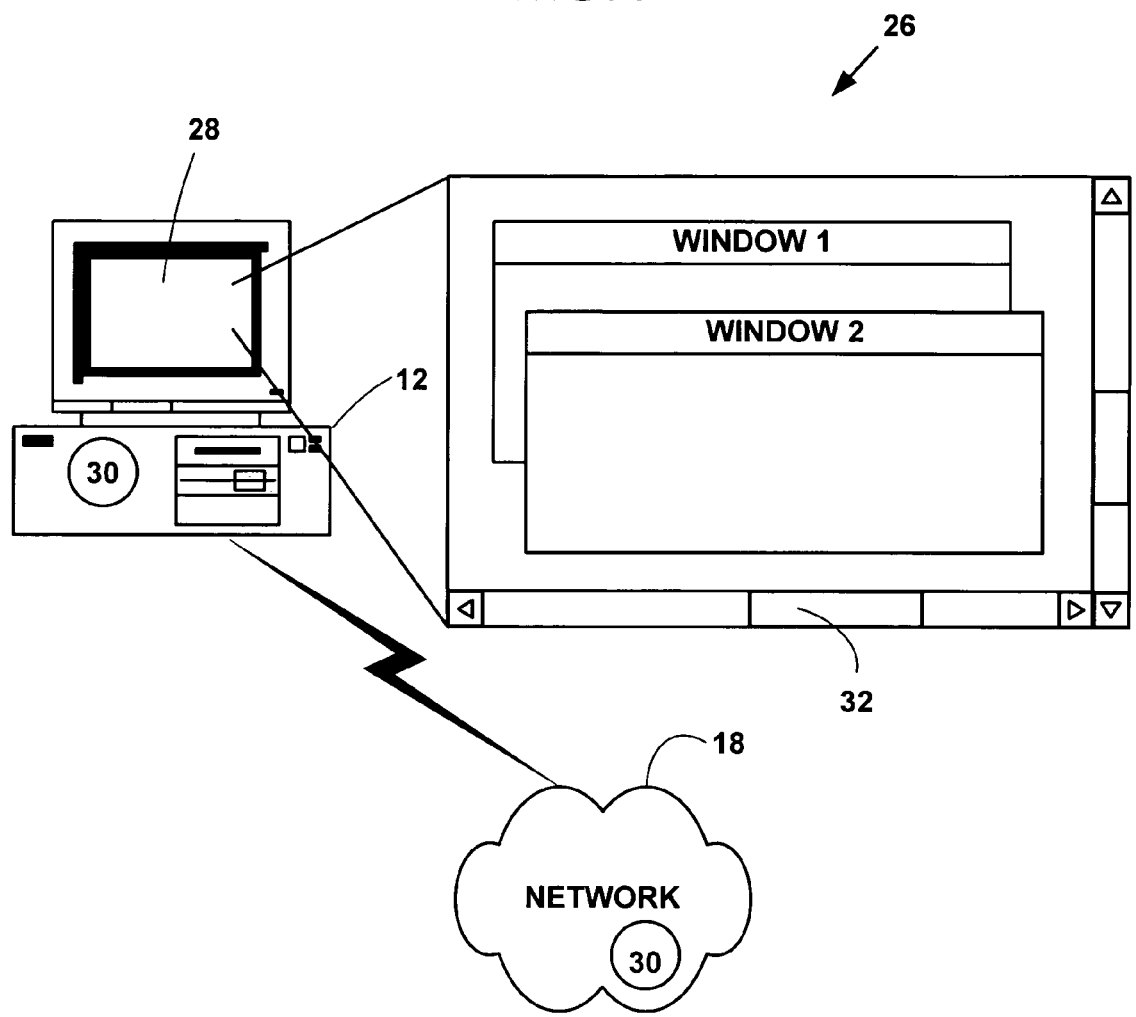
FIG. 2 is a block diagram illustrating an exemplary electronic trading display system.

FIG. 2 is a block diagram illustrating an exemplary electronic trading display system 26. The exemplary electronic trading system display system includes, but is not limited to a target device (e.g., 12) with a display 28. The target device includes an application 30 that presents a graphical user interface (GUI) 32 on the display 28. The GUI 32 presents a multi-window interface to a user.

In one embodiment of the invention, the application 30 is a software application comprising plural software modules. However, the present invention is not limited to this embodiment and the application 30 can be firmware, hardware or a combination thereof of software, firmware and/or hardware.

An operating environment for the devices of the electronic trading system 10 and electronic trading display system 26 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It is appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Exemplary Method for Processing Electronic Information for Electronic Trading

Figure 3:
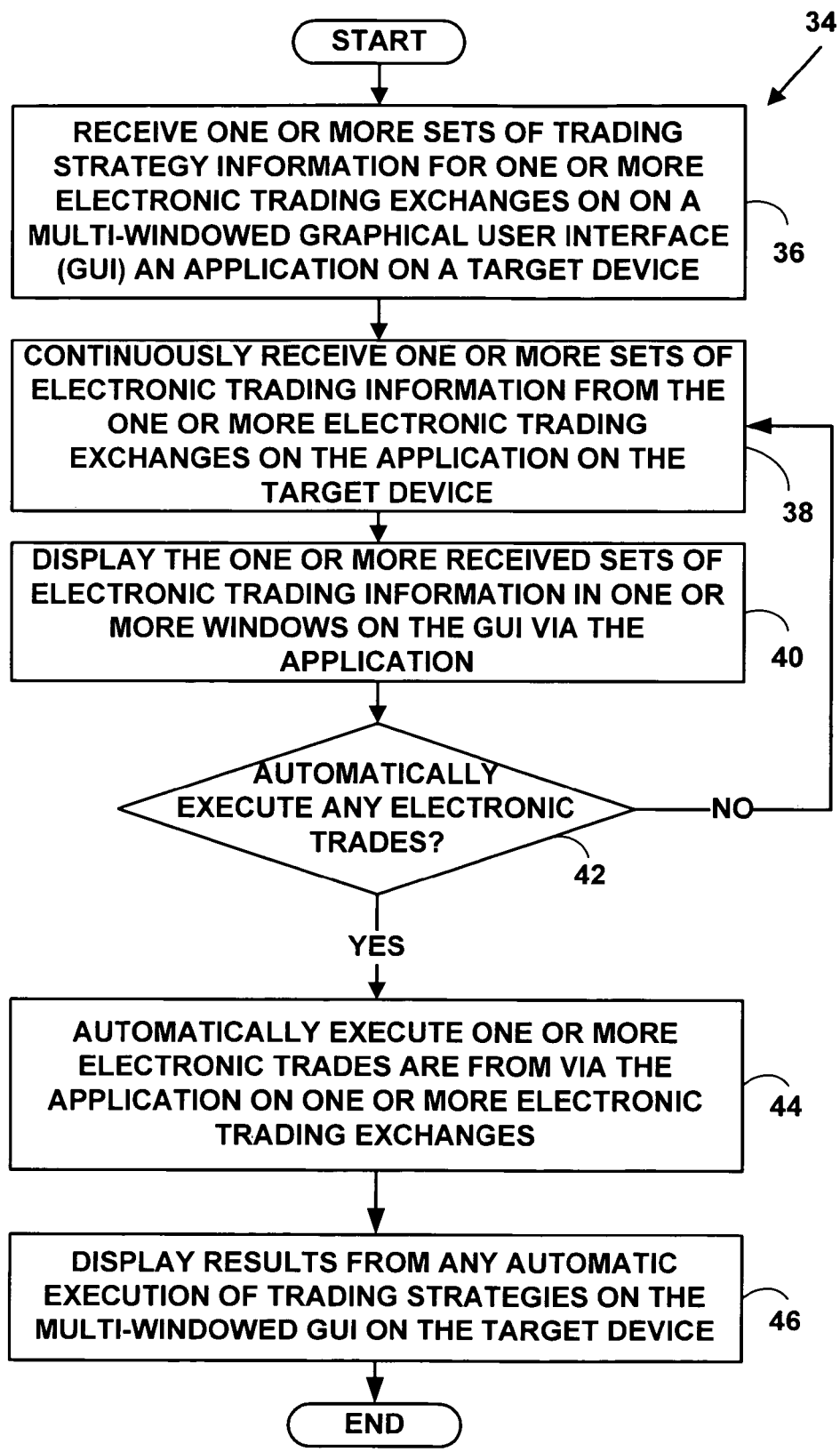
FIG. 3 is a flow diagram illustrating a method for displaying electronic information for electronic trading.

FIG. 3 is a flow diagram illustrating a Method 34 for processing electronic information for electronic trading. At Step 36, one or more sets of electronic trading strategy information is obtained via one or more windows on a application 30 on a target device 12, 14, 16 to automatically execute one or more electronic trades on one or more electronic trading exchanges 20, 22. At Step 38, one or more sets of electronic trading information are continuously received on the application 30 via one or more application program interfaces (API), fixed or dynamic connections from one or more electronic trading exchanges 20, 22. At Step 40, the one or more sets of electronic trading information are displayed in one or more windows on the GUI 32 via application 30. At Step 42, a test is conducted to determine if any electronic trades should be automatically executed based on the one or more sets of electronic trading strategy information. If any electronic trades should be automatically executed, at Step 44, one or more electronic trades are automatically electronically executed via application 30 an appropriate electronic trading exchange 20, 22. At Step 45, results from any automatic execution of any electronic trade are formatted and displayed in one more windows on a multi-windowed graphical user interface (GUI) 32.

In one embodiment the one or more sets of electronic trading strategy includes a pre-determined trading strategy created by a trader, if-then trading strategies, one-cancels-other (OCO) trading strategies and electronic trading strategies for synthetic instruments or synthetic contracts, or execution of strategies based on previously executed orders.

As is known in the art, the pre-determined strategy trading strategy is a pre-determined trading strategy developed by a trader to apply to a desired market (e.g., cash, futures, stocks, bonds, options, spreads etc.)

As is known in the art, a "synthetic" instrument or contract includes an instrument or contract that does not really exist on any electronic trading exchange. A synthetic can be made up of one, or several contracts that trade on an exchange or multiple exchanges. For example, a synthetic contract may include automatically selling a call and buying a put. Such a synthetic contract does not exist on any trading exchange but is desirable to a selected group of traders As is known in the art, an API is set of routines used by an application program to direct the performance of actions by a target device. In the present invention, the application 30 is interfaced to one or more API.

In another embodiment, the application 30 is directly interfaced to a fixed or dynamic connection to one or more electronic trading exchanges without using an API.

In one exemplary embodiment of the invention, the application 30 interfaces with a Client API provided by Professional Automated Trading Systems (PATS) of London, England, or Trading Technologies, Inc. (TT) of Chicago, Ill. GL Multi-media of Paris, France and others. These APIs are intermediate APIs between the Application and other APIs provided by electronic trading exchanges. However, the present invention is not limited to such an embodiment and other APIs and other fixed or dynamic connections can also be used to practice the invention.

The application 30 presents a user a multi-windowed GUI 32 that implements the functionality exposed through API provided by electronic trading exchanges. The application 30 allows the user to subscribe to and receive real-time market data. Additionally, the application 30 allows the user to enter futures orders, cash orders, and other types of financial products orders to all supported exchanges and receive real-time order status updates. The application 30 supports at least two methods of order entry; Order Ticket and Aggregated Book View (ABV).

The application 30 provides flexibility to the user to configure the display of electronic information on the GUI 32. The application 30 and the GUI are now described in further detail.

Desktop Layout Management

The application 30 provides the ability to manage Desktop Layouts. A Desktop Layout is a state of a GUI 32 as it appears to a user. This includes, but is not limited to, number of windows, types of windows, and the individual window settings. A user is able maintain a list of available Desktop Layouts. Each Desktop Layout has a unique name within the application 30. The user is able to create a new Desktop Layout and save it, giving it a unique name. When the user saves a Desktop Layout, it is not saved in a minimized state but is instead saved in an expanded state. The user is able to rename, copy, and delete a Desktop Layout. The user is able to load a saved desktop layout, replacing the currently displayed configuration. The application 30 receives and loads desktop layout templates from the communications network 18 upon user login. The user is able to export and import desktop layouts in order to port them from target device to target device. Desktop Layouts are saved on a user by user basis (e.g., by username). If two users access the application 30 from the same target device 12, each user sees their own list of layouts upon login.

The application 30 is launched from target device 12, 14, 16 or via the network 18 (e.g., the Internet, an intranet, etc.) The application 30 is installed on a target device 12, 14, 16 or the communications network 18. Upon startup, the application 30 detects if a new version is available. If the application 30 detects that an upgrade is warranted, a window appears, asking the user if they would like to install the latest version now. In one embodiment, if the user chooses not to install the latest version upon startup, the current (older) version of the application 30 is launched. In another embodiment, another prompt is displayed when the user logs off. In the case of a critical update, the user is not able to choose to run the application 30 without installing the update.

The application 30 is pushed information that determines which servers the application 30 is to connect to. IP addresses or Domain Name Servers (DNS) names are pushed to the client when upon login.

In one embodiment, the application 30 can be used by up to about 5,000 simultaneous users. Scalability allows the application 30 to be used by up to about 20,000 simultaneous users. However, the present invention is not limited to such an embodiment and other embodiments with other numbers of simultaneous users can also be used to practice the invention.

The application 30 indicates the status of a host connection 20, 22, 24 on the communications network 18. As a minimum, "Connecting," "Connected" and "Not Connected" statuses are indicated. The application 30 indicates the status of an electronic trading exchange server connection 20, 22. As a minimum, "Connecting," "Connected" and "Not Connected" statuses are indicated for the electronic trading exchange server connection.

If settings (e.g., accounts, contracts, etc.) change on a host system 20, 22, 24, the application 30 updates the settings. The user does not have to log back in to see the changes. The application 30 has the ability to detect if any changes to accounts or contracts have been made. The application 30 is able to detect when a system administrator has changed a network address (e.g., an Internet Protocol (IP) address, etc.) of the primary transaction server for a client.

The application 30 can log off of one network address and log onto another. Data integrity is maintained when a network address change has been made. The application 30 notifies the user of any working orders or open positions before closing. The user has the opportunity to cancel the logout if they would like to cancel working orders or close the open positions. The application 30 performs the normal logoff cycle when closed by the user. The application 30 saves all data needed to return it to the state it was in when the application 30 was closed. The application 30 saves all data necessary to restore it to the current state in the case of a catastrophic application 30 failure. If the user does not choose to download the most recent version of the application 30 upon startup, a message appears upon logoff asking the user if they would like to install the upgrade before closing.

The application 30 gracefully log users out at end of day. The user receives a warning message, stating that the session is about to be closed. The user needs to log back in to reestablish the connection. The application 30 allows the user to combine the display of data of different types. Data types include, but are not limited to, Orders, Fills, Positions and Market Data. The application 30 supports the functionality exposed through the current version of a client API.

The application 30 supports data format differences between exchanges that are not normalized by the client API. The application 30 supports differences between exchange order handling semantics that are not normalized by the client API. The application 30 gracefully handles spreads. The application 30 support systems with multiple monitors. All exchange contracts supported by a platform are considered by the application 30. Online user documentation is available to the user. The application 30 runs on Windows 2000, Windows XP operating systems and other windowed operating systems (e.g., Linux, etc.). The application 30 architecture is flexible in order to allow additional functionality to be added when needed.

Standard Windows Grid

In a Standard Windows Grid, a user can select from a list of columns to display. The user is able to add or remove columns, but all columns may not be able to be removed and certain columns may need to be added in order to add other columns (if there are dependencies). Each window will have certain columns that appear in the grid by default. The grid has a column heading with a caption (column name).

The user can change an order of the displayed columns by dragging the column heading to a new position. The user can manually resize a column. The user can resize all columns to fit the screen. The user can resize all columns to fit their contents. The user can resize a selected column to fit the column's contents. This is accomplished by double clicking on the column heading's right border. The user can change the foreground and background colors of a column. The user can rename any grid column. The user can restore the default grid column names. The user can restore all default grid settings.

The user can change the font for all columns in the grid. This includes, but is not limited to font type, color and size. The user can change the font for an individual column. This includes, but is not limited to, font type, color and size. The user can sort the data in the grid by clicking on a column heading. The user can sort the data in ascending or descending order. The user can create multiple sort criteria. The user can create a filtered view of the information in a grid. The user can filter on multiple criteria for non-numeric columns. Filters can include more then one column. Multiple filters for numeric columns can be created (e.g., for an $=, \neq, <, >, \leq$ or $\geq$ operation, etc.). This functionality also allows the user to choose a range. The user can remove filters from a grid. Data in a grid will continue to be updated while a filter is applied.

Login Window

A Login window will be launched via the application 30 when the application 30 is first accessed by the user. A user will enter a user name and password in order to log into the application 30. A successful login will allow the user full access to multi-windowed GUI 32 functionality. A failed login displays a message to the user, indicating that either the user name or password were invalid, but not which one. If Caps Lock is on, the failed login message the application 30 indicates this fact. The failed login message reminds the user about case sensitivity. The user is able to change passwords. The user does not have to be logged into the communications network 18 to change passwords.

The application 30 updates a database with the new password. All characters entered into a password field will be visible to the user as asterisks. A single login allows the user access to all supported and enabled exchanges.

Application Manager Window

Application Manager Window allows the user to access all of the functionality of the application 30. It is via these windows that other application windows are launched and managed. The GUI 32 windows are automatically launched once the user has successfully logged in. Only one Application Manager window is launched by the application 30.

The Application Manager Window, by default, is a member of every display layout on the GUI 32 and cannot be removed. The user is able to view a list of available Desktop Layouts and select one to work with.

The user can create a new Tools window, Settings window, Contact and Quotes Window, Orders and/or Fills window, Positions/Market Data window, Aggregated Book View window, Order Ticket window and Reports window from the Application Manager Window. The user can also open a saved window from the Application Manager Window.

The user can maintain Desktop Layouts from the Application Manager Window. The user can minimize all windows and restore all windows from the Application Manager Window.

Client Messaging Window

A Client Message Window allows the user to view system messages, trading exchange messages and alerts. This window is automatically launched once the user has successfully logged in. In one embodiment, only one Client Messaging window may be launched by the application 30. In another embodiment, more than one Client Message windows may be launched by the application 30. The Message display, by default, is a member of every display layout and cannot be removed. Users who are logged on must be able to receive system messages, communications from office personnel, electronic trading exchange messages and alerts from various electronic trading exchanges 20, 22. Alert receipts are displayed for the user. The window displays the entry and cancellation of orders (as messages). Alerts are given a priority, including, but not limited to, of "Critical," "High," "Medium" or "Low."

Alerts of a high priority are presented in a more intrusive manner than lower priority alerts. Upon login, users receive alerts from the current day that were sent while they were logged off. The user is able to turn off the display of alerts and are able to turn off the display of messages.

Tools Window

Figure 4:
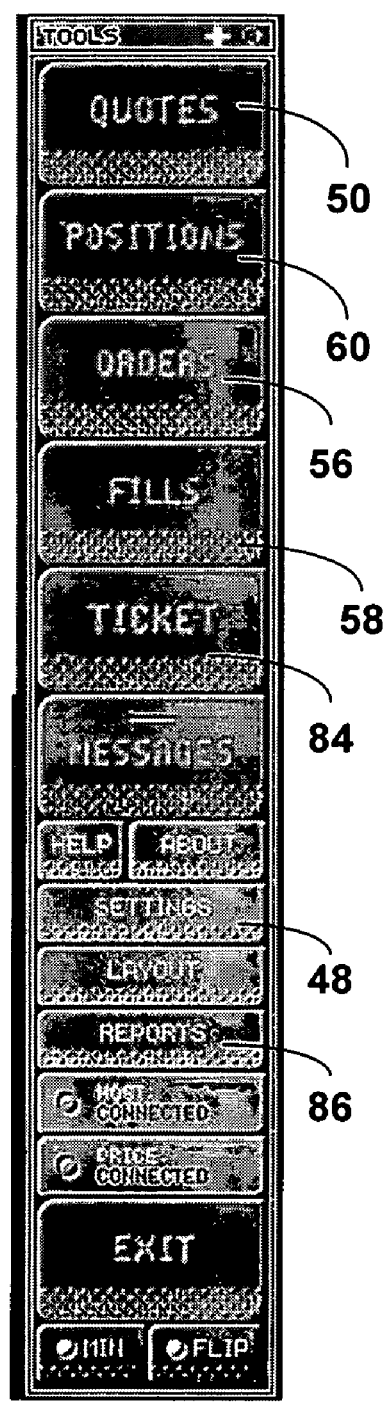
FIG. 4 is a block diagram of a screen shot of an exemplary tools window.
Figure 5:
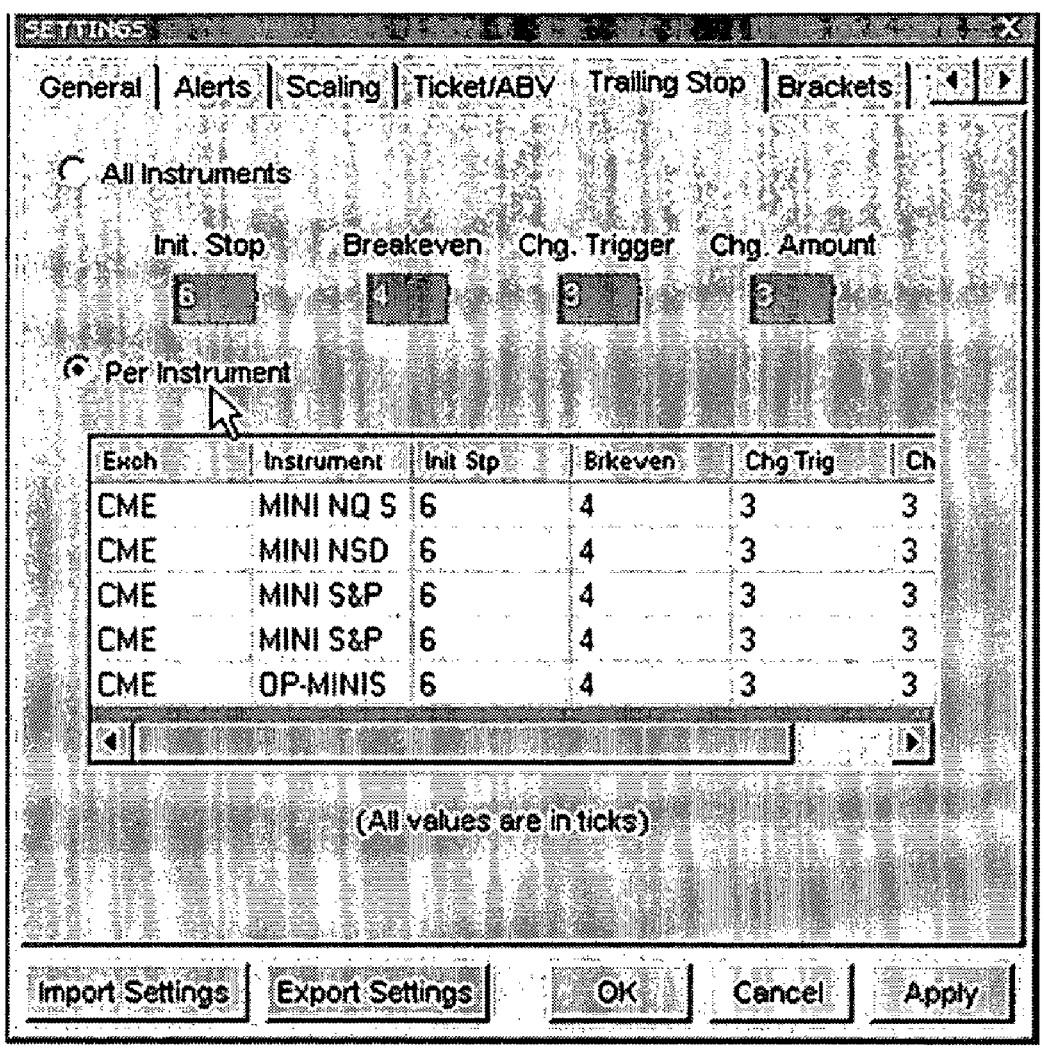
FIG. 5 is a block diagram of a screen shot of an exemplary settings window.

FIG. 4 is a block diagram of screen shot of an exemplary Tools window 46 produced by application 30 and displayed on the GUI 32. The Tools window 46 is used to launch other windows described herein on the GUI 32.

Settings Window

FIG. 4 is a block diagram of screen shot of an exemplary Settings window 48 produced by application 30 and displayed on the GUI 32. The Settings window 48 allows the user to enter application-wide settings (such as defaults, etc.) This window 48 is accessible via the Manager window. The window 48 is different from any other window in the application. Multiple Settings windows cannot be opened, and this window is not part of a Desktop Layout.

The Settings window 48 displays network address (e.g., local and Internet IP addresses) of a target device 12, 14, 16. The Setting window 48 displays the Host and Price server IP addresses and ports that are being used by the application 30.

In one embodiment, the user loads settings from a settings file via the Settings window 48. The settings file contains information necessary to replicate the configuration of an application, including settings and desktop layouts. For audible alerts, each alert should have a different sound. The user can browse for sound files to assign to events. In another embodiment, settings are loaded from automatically from data structure within the application 30.

The user can turn on or off audible and/or visual alerts for the events listed below in Table 1. However, the present invention is not limited to these audible and/or visual alert events and more, fewer or other types of audible and/or visual alert events can be used to practice the invention.

TABLE 1

Logout
Login
Receipt of a fill
Entry of an order
Entry of an order amend
Entry of a cancel request
Receipt of an order
Receipt of a cancel
Receipt of an amend
Receipt of a reject
Receipt of a message
Order state timeouts
Loss of connection to the host server
Loss of connection to the price server
Reconnection to the host server
Reconnection to the price server
Receipt of SARA alerts
A different sound/visual alert is used for each priority level.
Limit breach
Contract breach

TABLE 1-continued

Exchange disabled
Stop price triggered for synthetic stops and stop limit orders
Pull all orders
End of day/End of market
By exchange
This information is downloaded on login if an update is needed.
Custom Reminders
OCO fill
OCO cancel
Parked order violated
If Then fill
If Then cancel
P/L bracket fill
P/L bracket cancel The user can set the following defaults for an order ticket listed in Table 2. However, the present invention is not limited to these defaults and more, fewer or other types of defaults can be used to practice the invention.

TABLE 2

Default Account
Default Exchanges and Contracts
Default Order Type
    The user can set the default order type by exchange or to set the same default
    for all exchanges.
Default side
Default Quantity
    The user can set the default quantity by instrument or to set the same default for
    all instruments.
Close after order entry
    The user can determine whether or not the Order Ticket should close by default
    after an order has been entered.
Quantity set to zero after order entry
    The user can determine whether or not the order quantity should return to zero
    once an order has been placed.
Default price for limit orders - Sell
    The user can determine whether the price for sell limit orders should default to
    current bid, ask, or last.
Default price for limit orders - Buy
    The user can determine whether the price for buy limit orders should default to
    current bid, ask, or last.
Other Settings
Always on Top
    The user can set which window should stay on top by default (if any).
    This default may be overridden on a window by window basis.
Order State Timeouts
    The user can set the amount of time that an order can remain in a state of Sent,
    Queued, Cancel Pending or Amend Pending before an order state timeout alert
    is generated.
Custom Reminders
    The user can create and maintain a list of custom reminders, which will create an
    audible and visual alert at the set date and time.
    The user can assign a title, date, time and description to each reminder.
    Custom reminders are saved on the local machine.
ABV Market Depth
    The user can set the amount of market depth displayed on the ABV window.
    A Market Depth setting greater than the maximum depth disseminated by the
    exchange will be treated as the exchange maximum.
Hot Keys
    The user can assign program shortcuts to keyboard function keys.
Fonts
    The user can set a default font for all text on all windows.
    The user can restore all fonts to the font selected here (after changes have been
    made on individual windows).
Key Pad (for Quantity)
    The user can assign the values for keypad buttons.
    These values will be displayed on the key.
Order Quantity Limits (Fat Finger Rules)
    The user can set the maximum quantity that may be entered for an order.
    An order exceeding this limit will not be entered.
Commissions
    The user can enter commission amounts by exchange and/or by instrument.
    The commissions set here are used in the user's P&L calculations.

TABLE 2-continued

Print Reports
    The user can choose whether or not a window should appear upon logoff, asking
    if reports should be printed.
    From the window (if displayed), the user should be able to specify which reports
    are printed.

Contracts and Quotes Window

Figure 6:
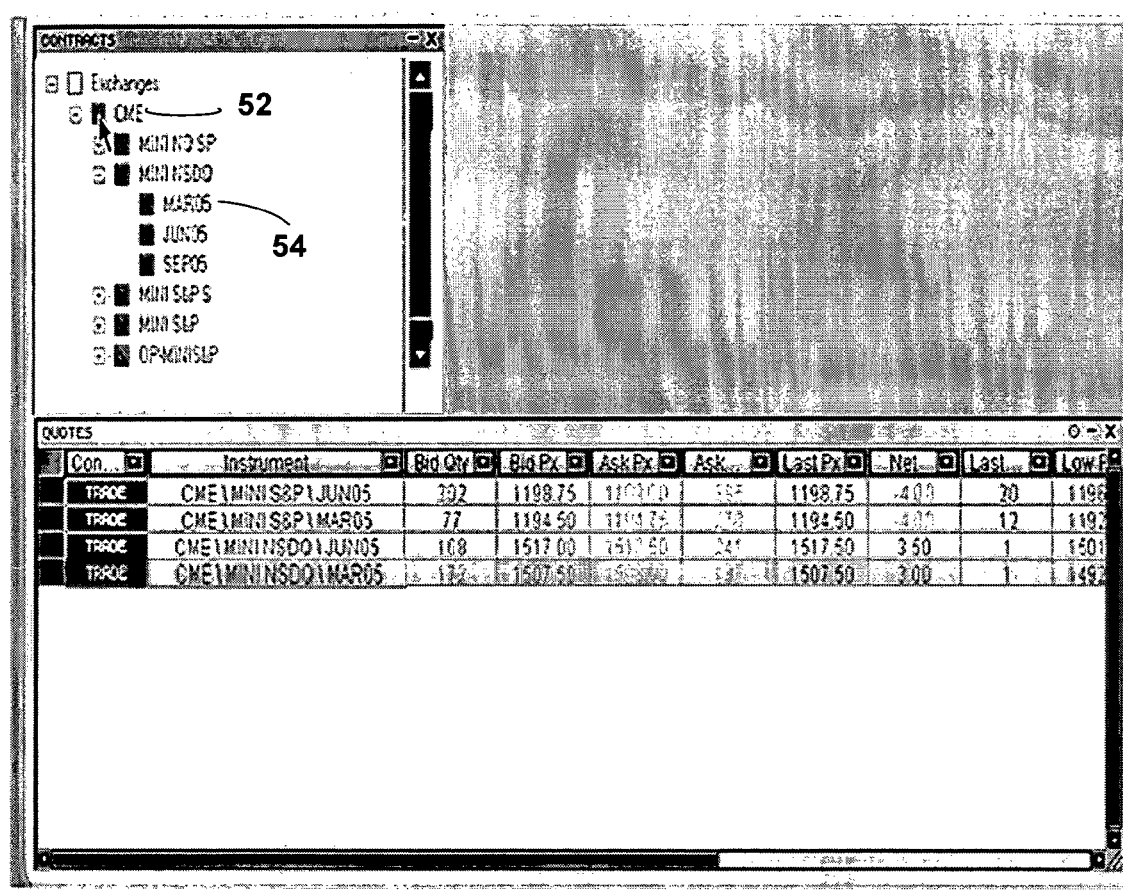
FIG. 6 is a block diagram of a screen shot of an exemplary quotes and contracts window.

FIG. 6 is a block diagram of screen shot of an exemplary Quotes and Contracts window 50 produced by application 30 and displayed on the GUI 32. The user can select which exchange 52 (e.g., Chicago Mercantile Exchange (CME), Chicago Board of Trade (CBOT), New York Stock Exchange, etc.) and which instruments, contract and contract date combinations (e.g., Mini NSDQ March 2005) to display 54. Market data associated with a position by the unique instrument information is also displayed.

Order and Fills Windows

The user is able to display any combination of order and fill information that they choose (although some information must be displayed in order for other information to be displayed) in Order and Fill windows respectively. The user is provided with an Orders template and a Fills template, which will each display different default data (and, therefore, provide different functionality based on user defined preferences set via the Settings window 48).

FIG. 7 is a block diagram of screen shot of an exemplary Order window 56 produced by application 30 displayed on GUI 32. Typically, an order is created by the user and submitted to an electronic trading exchange 20, 22 for possible execution. One exception to this is the Parked order. In this case, the application 30 saves the order until it is released by the user to the electronic trading exchange 20, 22.

In one embodiment, the Order window 56 displays, but is not limited to, a controls identifier, a state identifier (e.g., rejected, working, filled, held) an account identifier (e.g., APIDEV5), an order number, an instrument identifier (e.g., CME\MINI S&P), a side designation identifier (e.g., buy or sell), a quantity, a price, a type identifier (e.g., limit, pre-defined stop price, market price) an average price. However, the present invention is not limited to displaying these items and more, fewer or other items can be displayed in the Order window 56 to practice the invention.

FIG. 8 is a block diagram of screen shot of an exemplary Fills window 58 produced by application 30 displayed on GUI 32. Typically, a fill is an acknowledgment from an electronic trading exchange 20, 22 where the order was submitted that all or part of the order was executed. A special case is an external fill. An external fill is submitted manually by a system administrator.

In one embodiment, the Fills window 58 displays, but is not limited to, a control identifier, an order identifier, an instrument identifier, a side identifier, a fill quantity, a fill identifier and a fill price. However, the present invention is not limited to displaying these items and more, fewer or other items can be displayed in the Fills window 58 to practice the invention.

A new or saved Order and Fill windows 56, 58 can be launched from the Application Manager window. When the user creates and submits an order to an electronic trading exchange 20, 22, an order with a quantity greater then the maximum order limit will be rejected by the application 30. The user can create a trailing stop order against a filled order. The user is also able to create a Profit/Loss bracket around a filled order.

The user can also create a "Parked" order. A Parked order is an order that is created by the user but not submitted to an electronic trading exchange 20, 22. Parked orders are saved by the application 30 and made available to the user between application 30 launches. The user can change a working order to a parked order and visa versa. Changing a working order to a parked order, the application 30 sends a cancel to the selected electronic trading exchange 20, 22. On receipt of the cancel acknowledgement, the application 30 will change the order state to indicate that the order is parked.

The user can also submit a Parked order to an electronic trading exchange 30. The user can submit all parked orders at once. The user can select certain parked orders to submit (at once). The user can change the electronic trading exchange and/or contract for a parked order. If the user changes the contract, the application 30 will verify that the entered price is valid for the new contract. If the entered price is invalid for the new contract, the application 30 will prompt the user to change the price. The user can change the account for a parked order.

The user can cancel a working order. In one embodiment, a working order can be canceled with a single mouse click. In another embodiment a working order can be canceled with two mouse click, one to cancel the order and one to confirm cancellation. The user can cancel all working orders in a selected account, cancel all working buy orders in the selected account, all working sell orders in the selected account.

The user can delete a parked order. The use can delete a parked order with a single mouse click. The user can delete all parked orders in a selected account. The user can delete all parked orders in all accounts.

The user can change the following order information (for a working order) illustrated in Table 3. However, the present invention is not limited to this order information and more, fewer or other types of order information can be used to practice the invention.

TABLE 3

Prices (stop/limit/stop limit)
Quantity
    The user must be able to display the detailed order history for an
    order (both parked orders and those submitted to an exchange.
The order history includes orders that led to the current order if the order
was created by a cancel/replace or a parked order.

The user can also create a trailing stop order against a fill. The user can create a Profit/Loss bracket around a fill. The user can launch an Order Ticket window from a specific fill. When an Order Ticket is opened from a fill, the ticket is pre-populated with the data that corresponds to that fill (e.g., exchange, instrument, quantity, etc.)/The side of the Order Ticket will be opposite that of the fill. Supported order types will be available to be created from the Order Ticket. Trailing stops and brackets can be linked to another order, such as a limit order. When this order is executed the Trailing Stop or bracket, etc. is then submitted to the market, or held "working" on the target device 12, 14, 16.

The Fills window 58 displays a detailed view of a fill. A fill detail includes all available fill information (including partial fills). The application 30 handles external fills. The application 30 uses separate display indicators if the fill is external (e.g., color difference, etc) on the GUI 32.

In one embodiment, Order and Fill information is displayed following standard window rules laid out by the Standard Window. The data in this Order and Fill window is displayed in the standard grid format, as described in the Standard Grid. This window will display order and fill data. The user chooses which fields should be displayed in the grid (some fields will appear by default) on the GUI 32.

Table 4 illustrates a list of order information that used in the Order and Fill windows 56, 58. Most of the information is exposed through the APIs used. However, in a few cases the information is calculated. These exceptions are indicated where they occur. However, the present invention is not limited to this order information and more, fewer or other types of order information can be used to practice the invention.

TABLE 4

Order ID
Display ID
Exchange Order ID
User Name
Trader Account
Order Type
Exchange Name
Contract Name
Contract Date
Buy or Sell
Price
Price2
Lots
Linked Order
Amount Filled
Number of Fills
Amount Open
 This field is calculated by the application 30 using contract lots minus amount filled. Average Price
 This field (the average price of all fills that make up an order) is calculated by the application 30 because the API does not return the correct value if there is only one lot.
Status
Date Sent
Time Sent
Date Host Received
 This field will not displayed to the user, but is used for logging.
Time Host Received
 This field will not be displayed to the user, but is used for logging
Date Exchange Received
 This field will not be displayed to the user, but is used for logging.
Time Exchange Received
Date Exchange Acknowledged
Time Exchange Acknowledged
Non Execution Reason
Good-Till-Date Table 5 illustrates a list of fill information that used in the Order and Fill windows 56, 58. Most of the information is exposed through the APIs used. However, in a few cases the information is calculated. These exceptions are indicated where they occur. However, the present invention is not limited to fill information and more, fewer or other types of fill information can be used to practice the invention.

TABLE 5

Display ID
Exchange Order ID
User Name
Trader Account
Order Type

TABLE 5-continued

Figure 9:
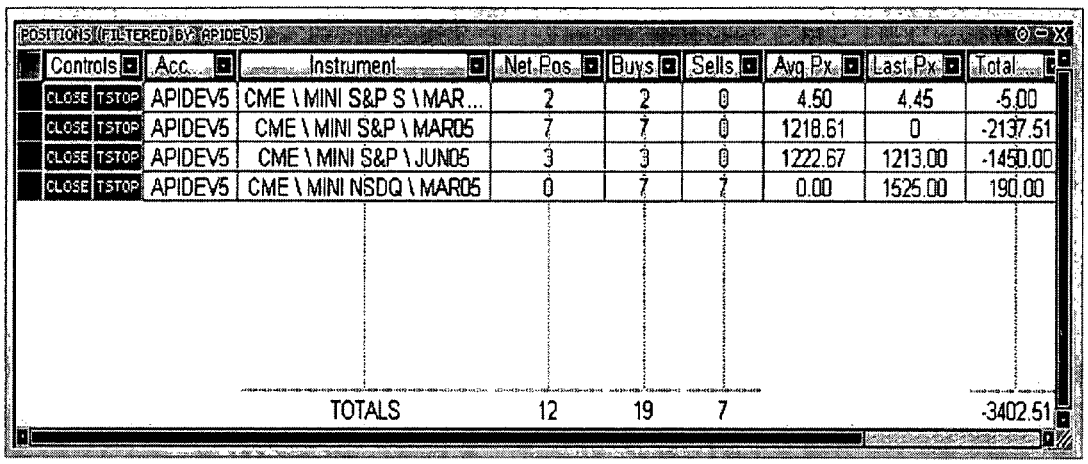
FIG. 9 is a block diagram of a screen shot of an exemplary position and market data window.

Exchange Name
Contract Name
Contract Date
Buy or Sell
Lots
Price
Average Price
 This field will need to be calculated by the application because the API does not return the correct value if there is only one lot.
Date Filled
Time Filled
Date Host Received
 This field will never be displayed to the user, but is used for logging.
Time Host Received
 This field will never be displayed to the user, but is used for logging
Fill Type
Fill, External, Netted, Retained Positions/Market Data Window FIG. 9 is a block diagram of screen shot of an exemplary GUI 32 Position and Market Data window 60 produced by application 30 displayed on the GUI 32. The Positions and Market Data Window 60 provides representation and display of open positions and market data in the application 30.

In one embodiment, the Positions and Market Data window 60 includes, but is not limited to a display of a controls identifier, an account identifier, a net position, a number of buys, a number of sells, an average price, an last price and a total. However, the present invention is not limited to displaying these items and more, fewer or other items can be displayed in the Position and Market Data window 58 to practice the invention.

The user can display any combination of order and fill information that they choose (although some information must be displayed in order for other information to be displayed). The user is provided with an Orders template and a Fills template, which will each display different default data (and, therefore, functionality).

An "open position" is a long, short, or profit or loss in an instrument or contract in an account. This open position is the aggregation of all the fills received in the instrument. Market data is delivered to the application 30 in real-time through the APIs used. A new or saved Positions/Market window 60 can be launched from the Application Manager window. The user can launch an Order Ticket window 84 from a specific position.

Figure 10:
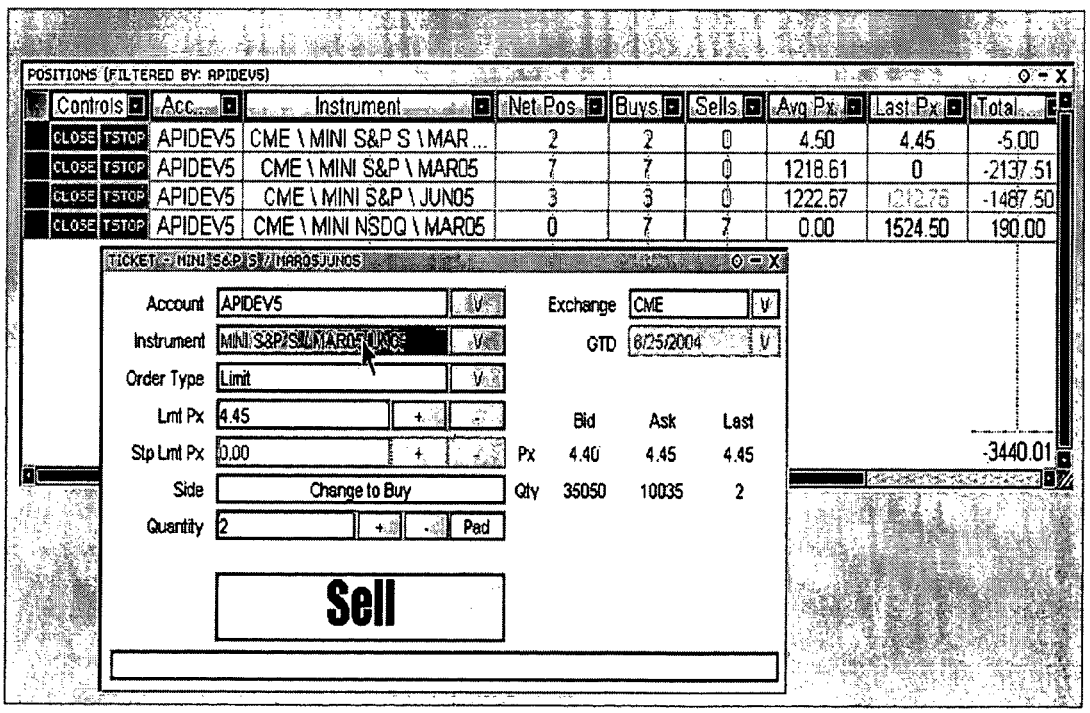
FIG. 10 is a block diagram of a screen shot of an exemplary position and market data window for an order ticket from a sell position.

FIG. 10 is a block diagram of screen shot of an exemplary Position and Market Data window for an Order Ticket from a sell position 62 produced by application 30 and displayed on the GUI 32. When a ticket is opened from a position, an Order Ticket window 84 is pre-populated with the data that corresponds to that position (e.g., exchange, instrument, quantity, etc.). For example in FIG. 10, an Order Ticket window includes data (e.g., APIDEV5, CME\MINI S&P, Limit, Limit P×4.45, Quantity 2, etc.). The side of the Order Ticket will be opposite that of the position. The user can launch a window that will allow them to create a Profit/Loss (P/L) Bracket around an open position. The order sides default to opposite of the position. The order quantities default to the position quantity. The user can also launch a window that will allow them to create a Stop or Stop Limit order against an open position.

Figure 11:
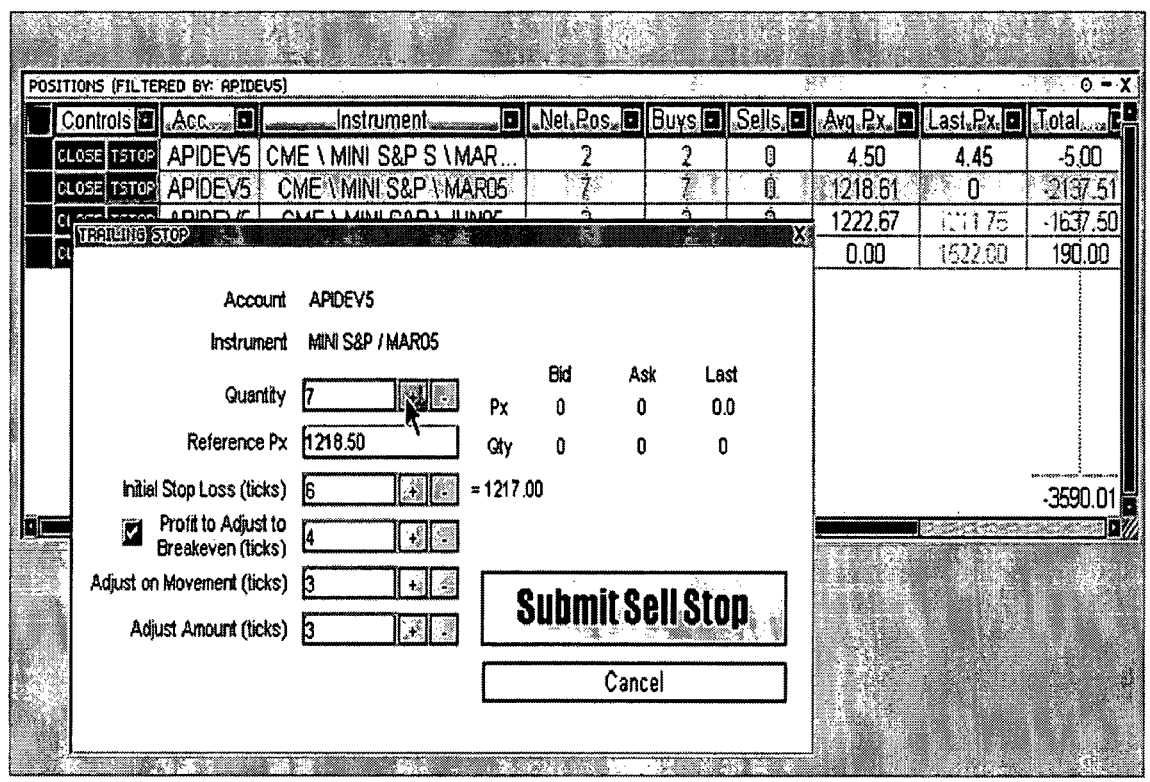
FIG. 11 is a block diagram of a screen shot of an exemplary position and market data window for a stop order.

FIG. 11 is a block diagram of screen shot of an exemplary Position and Market Data window for a sell stop order 64 produced by application 30 displayed on the GUI 32. The order side defaults to opposite of the position. The order quantity defaults to the position quantity. The user can also launch a window that will allow them to create a Limit order against an open position. The order side defaults to opposite of the position. The order quantity defaults to the position quantity.

The user can display all of the fills that comprise a position. The user can flatten the open position in the instrument for the selected account. The window 60 includes a Flatten button for flattening a net position. When the user chooses to flatten, working orders for the instrument are canceled and an order is entered that flattens the net position (i.e., the quantity of the order will be equal to the net position and the order will be placed on the opposite side of the net position). The flattening is achieved with a single order (i.e., the user cannot enter more than one order to flatten).

Position information and Market Data is displayed following standard window rules laid out in the Standard Window. The data in this window 60 is displayed in the standard grid format, as described in the Standard Grid.

Table 6 illustrates a list of position information that is available from this window 60. However, the present invention is not limited to this position information and more, fewer or other types of position information can be used to practice the invention.

TABLE 6

Account
Exchange Name
Contract Name
Contract Date
Net Position
Avg. Price
Open P&L
Cumulative P&L
Total P&L
Commission The GUI 32 will also show market data and position information. The user chooses which fields should be displayed in the grid (i.e., some market data fields will appear by default). Table 7 is a list of market data that is available from this window 60. However, the present invention is not limited to this market data more, fewer or other types of market data can be used to practice the invention.

TABLE 7

Exchange Name
Contract Name
Contract Date
Bid Price
Bid Size
Ask Price
Ask Size
Last Traded Volume
Net Price Change
Last Traded Price
High Price
Low Price
Opening Price
Closing Price
Total Traded Volume
Contract Status
    This is the status of the contract on the exchange (i.e. open, pre-open, trading, etc.)

Aggregated Book View (ABV) Window

The ABV Window allows the user to view bid size and offer size by price for a particular instrument in a market depth-type format. The window displays working orders for a selected account in a single instrument. The data on this window is displayed and updated in real-time. The window also allows the user to enter various order types. In one embodiment, two ABV widows are displayed by default. In another embodiment, one or more than two ABV windows are displayed by default.

Figure 12:
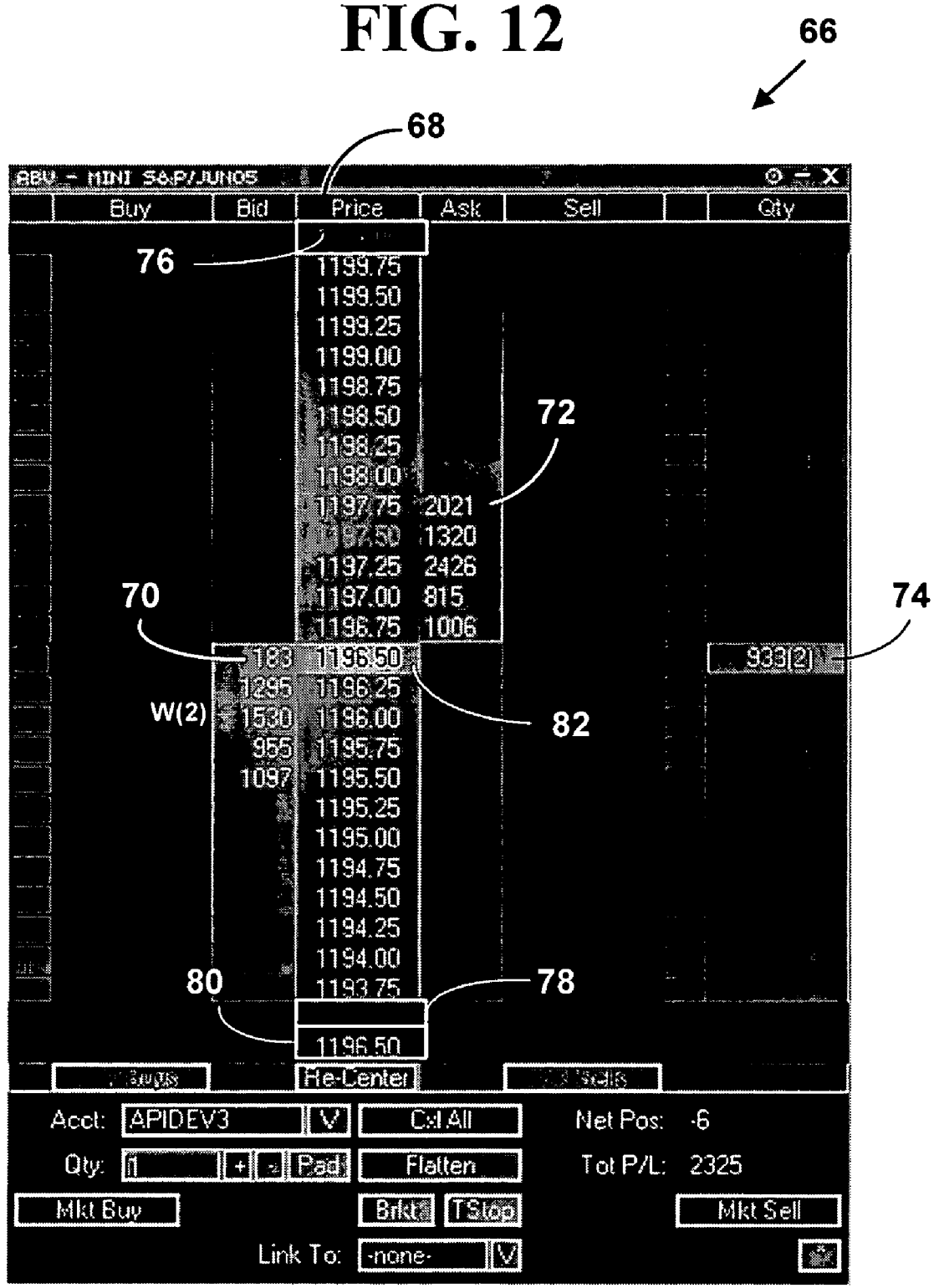
FIG. 12 is a block diagram of a screen shot of an exemplary ABV window.

FIG. 12 is a block diagram of screen shot of an exemplary ABV window 66 produced by application 30 displayed on GUI 32. The ABV window 66 includes a dynamically displayed Price column 68.

In one embodiment, the ABV window displays a buy column, a bid column, a dynamic price column, an ask column, a sell column, a quantity column, a re-center button, a cancel buy button, a cancel sell button, a cancel all button, a market buy button, a flatten button, a bracket button, a TStop button, a net position and a total P/L. However, the present invention is not limited to displaying these items and more, fewer or other items can be displayed in the ABV window 66 to practice the invention.

The user can select an instrument or contract to view in an ABV window 66, and can change the instrument or contract from this window 66. Changing the instrument or contract changes the data displayed to that of the selected instrument or contract. The user can select an account from available accounts. The window 66 displays the total quantity of orders working in the market at each price. Both buy and sell quantities are displayed. Quantities are updated as the instrument order book changes. The window 66 displays an indicator depicting the all of the user's open orders, for the selected account, at each price. The window 66 indicates a state of each order. Open order states include, but are not limited to: Queued, Sent, Working, Part Filled, Cancel Pending and Amend Pending, Held, Cancelled, Filled.

This window 66 indicates the order type for each order. The window 66 indicates the working quantity of each order. The window 66 displays parked orders for the selected instrument. The window 66 displays the user's net position in the selected instrument for the selected account. The window 66 displays the trade quantities for each corresponding price level. The user can select to view the total quantity currently trading at a price. This quantity is increased as each trade at a price occurs. The cumulative quantity remains in the window 66 until the price changes (at which time the cumulative trade quantity for the new price will be shown).

The user selects to view the last quantity currently trading at a price. This view shows the individual trade quantities. Only quantities for the current price are shown. The window 66 displays the total traded volume for the instrument. The window 66 displays all of the aforementioned data at once.

The user sets and adjusts the specified quantity for orders entered via this window 66. The quantity is set via a spinner, text entry or keypad entry. Each key-pad input increases a specified quantity by an amount displayed on the key (key value). The user selects to have the specified quantity set to zero after order entry. The user resets the quantity to zero (i.e., without entering an order). A right click on the mouse increases the quantity, left click decreases the quantity.

Orders entered via this window 66 will have a quantity equal to the quantity specified at time of entry. The default account for any orders entered from the ABV window 66 is the selected account. The can enter a limit order by clicking a cell in the bid quantity or offer quantity columns. Limit orders are default order type.

Order side will be set to BUY if the user clicks in the bid quantity column 70. Order side will be set to SELL if the user clicks in the offer quantity column 72. Orders will have a quantity equal to the specified quantity. Order limit price must equal the price corresponding to the clicked offer/bid quantity.

The user enters a stop order by clicking a cell in the bid or offer quantity columns 70, 72. Order side will be set to BUY if the user clicks in the bid quantity column 70. Order side will be set to SELL if the user clicks in the offer quantity column 72. Orders must have a quantity equal to the specified quantity. The order stop price will equal the price corresponding to the clicked offer/bid quantity. The order is entered for the selected account. The user is able to enter a buy stop below the market or a sell stop above the market. If the user does this, a window appears, warning the user that the buy or sell will be immediately executed.

The user can enter an OCO (One Cancels Other) pair of orders. The user can also enter a profit/loss bracket. The user can enter a trailing stop. The user can also enter an "If-Then Strategy."

The user can change the limit price of a working limit order by dragging the working order indicator to a new price. The user can change the stop price of a working stop order by dragging the working order indicator to a new price. This will cause a cancel replace to be entered at the electronic trading exchange 20, 22. The user can change the quantity of a working order by right clicking in the cell displaying the working order. A right click on a mouse displays a context menu listing order quantities centered on the current quantity. The user can also adjust account number.

The user can cancel a working order with a single mouse click. The user can cancel all open orders in the instrument for the selected account. The can cancel all open buy orders in the instrument for the selected account. The user can cancel all open sell orders in the instrument for the selected account.

Users can have orders at a price displayed as a concatenated total, or displayed as each individual order. When the display of individual orders is to large for the display, individual orders will be displayed starting with the first order entered and then the remaining orders that do not fit in the display will be concatenated. Concatenated orders are indicated as such using a symbol that is attached to the total. Users can also adjust the display of the ABV by adding or removing columns, buttons and functions.

The user uses the open position in the instrument for the selected account. This window 66 includes a Flatten button for flattening the net position. When the user chooses to flatten, all working orders for the instrument are canceled and an order is entered that flattens the net position (i.e., the quantity of the order will be equal to the net position and the order will be placed on the opposite side of the net position). The flattening is achieved with a single order (i.e., the user cannot enter more than one order to flatten).

The user can center the dynamic Price column 68 on the current market. The user can scroll the dynamic Price column 68 to display prices above or below the current market. All data is displayed real-time.

This ABV window 66 follows the standard window rules laid out in the Standard Window. The data in this window is displayed in a grid, but this grid will not follow all of the standard grid rules.

The user can choose from a list of columns to display. Certain columns will be displayed by default. Certain columns will not be removable (price for example). The user can change the order of the displayed columns by dragging a column heading to a new position. The user can manually resize a column. The user can resize all columns to fit the screen. The user can resize all columns to fit the contents. The user can resize a selected column to fit the contents. Double clicking on the column heading border sizes a column so that data only is displayed with no redundant space.

The user can change the font for all columns in the grid. The user can change the font for an individual column. The user can change the foreground color of a column. The user can change the background color of a column. The user can restore the default grid settings.

The ABV window 66 is resizable. When it is resized, the columns expand and contract so that all data is still shown. However, after resizing the window, the user can resize the columns to get rid of wasted space and then change the font size (i.e., so it's more readable when the screen is small).

This ABV window 66 will display the following fields illustrated in Table 8 in a ladder format. However, the present invention is not limited there fields and more, fewer or other types of fields can be used to practice the invention.

TABLE 8

Price
    Centered on the current market prices when launched.
Market Bid Quantity
Market Offer Quantity
Trade Quantity as determined in section 11.3 above
Open Buy Orders indicating status, type and quantity for each order
Open Sell Orders indicating status, type and quantity for each order
Parked Orders The ABV window 66 displays real-time data for a particular contract, allowing a user to get a current snapshot of the market. Thus, the ABV window 66 can also be considered an "Ask, Bid, Volume" window.

An instrument or contract can be added to an open ABV window 66 in the same way that a contract was added to the Quotes window 50. Simply select the contract that to display and then drag it into the ABV window 66. Contracts can be dragged from any of the windows displayed on the screen.

Once a contract has been added to the ABV window, the data illustrated in Table 9 is displayed on the ABV window.

TABLE 9

A current number of Bids 70 and Asks 72 on an electronic trading exchange 20, 22 for particular price levels.
A total quantity currently trading at a certain price.
A number in parentheses 74 next to the total quantity is the last quantity traded at that price.
A price in red is the daily high 76. A price shown in blue is the daily low 78. A last traded price is shown in gray 80.
The last traded price 82 is also highlighted on a dynamic price column 68. When there has been an uptick in this price, this cell will be green. When there has been a downtick, this cell will be red. If there has been no change, this cell will appear yellow.
The Buy and Sell columns display a total number of open orders at each particular price. For example, a "W2" in the Buy column indicates that there are working orders with a total quantity of two at the specified price.
Net Position and Total P/L on the ABV can be monitored by simply referring to the lower right hand corner of the window.

On the ABV window 66, the price of any open Buy or Sell orders can be amended. To change the price of an order, a row selector that corresponds with the order to amend is selected buy left-clicking and holding down a left mouse button, dragging a cursor connected to the mouse up or down to a desired new price and releasing the mouse button. A white cursor arrow appears to indicate a change in price. The price amended will be submitted as soon as the mouse is released. If there multiple orders at the same price (and on the same side), all of the orders will be amended to the new price when dragging the concatenated order. The user can cancel a signal order at a price where multiple orders exist. They can also modify a single order at a price where multiple orders exist. They do this by selecting the individual order and dragging and dropping.

Another feature of the ABV window 66 is that a desired position on the dynamically displayed Price column 68 can be moved. If it is desired to scroll up or down on a market price on the dynamically displayed Price column 68, the dynamically displayed Price column 66 is hovered over with a mouse. A yellow cursor arrow will appear, pointing up if the mouse cursor is in the top half of the dynamic price column 68, or down, if the mouse cursor is in the bottom half of the dynamic Price column 68. Clicking on the cursor arrow will scroll the grid in the direction that the arrow points.

The ABV window 66 provides a dynamic Price column 68 centered upon the lasted traded price that continuously changes with fluctuations in the last traded price. To enter an order, a mouse cursor is hovered anywhere in the ABV window 66. This mouse hover puts a user in the "order entry mode." In the order entry mode a trade near last traded price can be entered or prices on the dynamic price column can be manually adjusted away from the last traded price. To scroll up or down the market prices on the dynamic Price column 68 to enter a trade, the mouse cursor is hovered over the dynamic Price column 68. A large yellow arrow will appear, pointing up if the mouse curser is in the top half of the dynamic price column, or down, the mouse cursor is in the bottom half of the dynamic price column. Clicking on the large yellow arrow will scroll the prices in the dynamic price column in the direction that the large arrow points so a trade can be entered away from a current market price.

If the dynamic Price column 68 is scrolled up or down and the last traded price is not centered on your ABV, the dynamic price column will start to scroll until the last traded price is again centered in the ABV window 66. In addition, if there is no further activity from a mouse for a period of time the dynamic Price column 68 will also start to scroll. As a visual indication, just before the dynamic price column begins to scroll, the mouse cursor will turn yellow and start to flash. This is a warning that the ABV window is about to begin re-centering around the last traded price. If, at any time, the mouse cursor is moved out of the ABV window, you leave the order entry mode and the ABV will automatically re-center the dynamic price column on the last traded price the next time the market price changes.

Stop and limit orders can also be entered on the ABV window 66 with just a click of a mouse. Before entering limit or stop orders an account is chosen and a quantity is entered. If a user has access to multiple accounts, the user can select the desired account by using the Account drop down menu. The user can input a number of lots to trade by typing the number in, by using the + or − buttons, or by using a keypad. A default quantity can be set via the Settings window. After selecting an account and quantity, limit and stop orders can be placed.

To enter a Buy Limit order, the mouse is clicked in the Bid column next to the Price to enter the order for. A limit order to buy will be entered at that price for the quantity specified, and a new working order will be reflected in the Buy column. Likewise, to enter a Sell Limit order, the mouse is clicked in the Ask column next to the Price to enter the order for.

To enter a Buy Stop order, the mouse is right-clicked in the Bid column next to the Price to enter the order for. A stop order to buy will be entered at that price for the quantity specified, and a new order will be reflected in the Buy column. Similarly, to enter a Sell Stop order, the mouse is right-clicked in the Ask column next to the Price that you want to enter the order for.

In addition to Limit and Stop orders, Market orders can be executed on the ABV window 66 using the Market Buy and Market Sell buttons. The ABV window can also be set up so that a Bracket or Trailing Stop order will automatically be created any time an order entered via the ABV is filled. The Bracket and Trailing Stop parameters will default to the values set up on the Settings window. To link a Bracket or Trailing Stop order to all orders entered via the ABV, choose Bracket or TStop from the Link To drop down box. A small window pops up with the default parameters for a bracket. The bracket levels can be changed by typing in a desired number, or using the "+" and "−" buttons. A limit order will be the profit order type, and for a loss order type, either choose a stop or a trailing stop can be selected.

For example, if a stop order is chosen, as soon as the order was filled, two new orders were entered. A limit order was created at a price that is five ticks above the market order's price and a stop order was created at a price that is three ticks below the market order's price Both orders have the same quantity that the market order had. Because these orders were entered as part of a bracket, when one of these orders is filled, the other will automatically be cancelled. Likewise, TStop is chosen from the Link To drop down box, a small window will appear that allows you to view and change trailing stop parameters. Like the bracket, a trailing stop will be entered once an order entered via the ABV window 66 is filled.

The ABV also allows cancellation of some or all of working orders as well. To cancel a particular order, the mouse cursor is placed over that order in the Buy or Sell column, whichever applies, and a yellow X appears over the working order. A mouse click on the yellow X will cancel that particular order. If multiple orders are entered at the same price (and on the same side), they will all be cancelled.

Order Ticket Window

Figure 13:
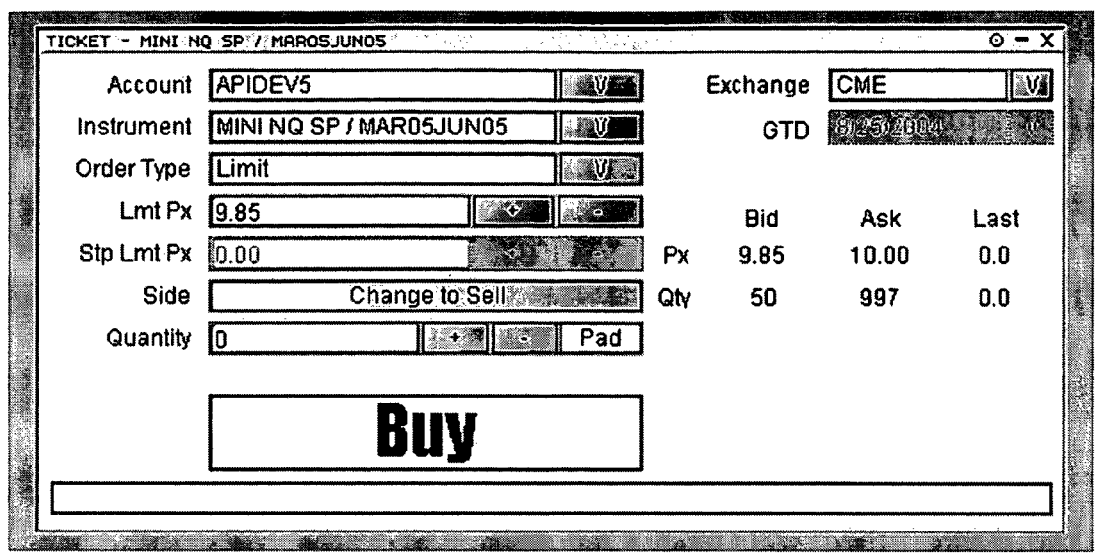
FIG. 13 is a block diagram of screen shot of an exemplary order ticket window.

FIG. 13 is a block diagram of screen shot of an exemplary Order Ticket window 84 produced by application 30 and displayed on GUI 32. This window 84 allows the user to create and enter all types of orders supported by the application and the APIs used. This window 84 is accessible via all windows except for Login, Settings, Client Messaging and Reports windows. Multiple order tickets can be launched and multiple windows 84 will be created. The Order Ticket window 84 is a member of a Desktop Layout. Order types, including Synthetic order types can be entered from this window.

In one embodiment, the Order Ticket window 84 displays, but is not limited to, an account identifier, an instrument or contract identifier, an order type, a limit price, if any, a stop limit price if any, a side identifier, a quantity identifier, an exchange identifier a current bid, ask, and last traded price, a current bid, ask or last traded quantity and a buy or sell identifier. However, the present invention is not limited to displaying these items and more, fewer or other items can be displayed in the Order Ticket window 84 to practice the invention.

If necessary, the Order Ticket window 84 will change or launch supporting windows to accommodate more complex order types. In one embodiment, the Order Ticket window 84 displays, but is not limited to, an account identifier, an instrument or contract identifier, an order type, a limit price, if any, a stop limit price if any, a side identifier, a quantity identifier, an exchange identifier a current bid, ask, and last traded price, a current bid, ask or last traded quantity and a buy or sell graphical button. However, the present invention is not limited to this embodiment and other embodiments can be used to practice the invention.

The user can select the account that the order applies to. The user can change the side of the order. The ticket background color depends upon the side chosen. For example, the background is set to blue for buy orders and set to red for sell orders. The following market data is displayed, but is not limited to, on this window 84 for the selected instrument: bid price, bid size, ask price, ask size, and last traded price.

This window 84 also does follow the standard window rules laid out in the Standard Window. The window can also be resized. The user can select to have the order ticket always on top. The default for this functionality is determined in the Settings Window. The Order Ticket window 84 is member of a Desktop Layout window. The Order Ticket window 84 settings are saved when it is a member of a Desktop Layout.

This window 84 is comprised of all the fields necessary to enter an order. The field defaults are set in the Settings window 48, but this window 84 may display different defaults depending on where it was launched from (for example, if it was launched from a specific fill or position).

Table 10 illustrate a list of the fields that are used to create a standard order. Synthetic orders also created directly from this window 84. In another embodiment, a separate window may be launched, or there may be some other method of accessing synthetic order entry. However, the present invention is not limited to this order information and more, fewer or other types of order information can be used to practice the invention.

for Login, Settings, Client Messaging and Reports. Multiple order tickets can be launched. The order ticket can be a member of a Desktop Layout window.

In one embodiment, the Reports window 86 displays, but is not limited to, an account identifier, an order identifier, an instrument identifier, a side identifier, a quantity, a price, an order type, an average price, a state, a price2, file, number of fills and an open column. However, the present invention is not limited to displaying these items and more, fewer or other items can be displayed in the Reports window 68 to practice the invention.

Order types, including synthetic order types are summarized from this window 86. If necessary, the Order Ticket window 84 changes or launches supporting windows to accommodate more complex order types. The user can select the account that the order applies to. The user changes the side of the order. Ticket background color depends upon the side

TABLE 10

Exchange
    The default value for this field is determined from the window where it was launched or in Settings.
Instrument
    This field is filtered to display valid instruments based on the exchange that is selected.
Contract Date
    This field is filtered to display valid contract dates based on the instrument that is selected.
Order Type
    This field is filtered to display valid order types based on the exchange that is selected.
Limit Price
    This field defaults to either the current bid, ask or last as determined by Settings and by the side.
    This price does not change once the order is open.
    This field is enabled only for stop, stop limit, MIT orders and the synthetic equivalents for those order types.
    The use is able to enter the price via keyboard entry or spinner,
Order Quantity
    The user is able to change the specified order quantity through a key-pad control. Each key-pad input increases the specified quantity by the amount displayed on the key (the key value).
    The user has ability to set the quantity back to zero.
    The user is able to select to have the specified quantity set to zero after order entry.
Secondary Price
    This field is enabled only for stop limit orders.
Good-Till-Date
    This field is enabled only for orders with TIF (Time in Force) of GTD.
    This field defaults to the current trade date.

Reports Window

FIG. 14 is a block diagram of screen shot of an exemplary Reports window 86 produced by application 30 displayed by GUI 32. The Reports window 86 allows the user to create and enter all types of orders supported by the application 30 and APIs used. This window is accessible via all windows except chosen. For example, the background is blue for buy orders and the background is red for sell orders.

Table 11 illustrates a list of the fields used to create a standard order report. However, the present invention is not limited to this order information more, fewer or other types of order information can be used to practice the invention.

TABLE 11

Exchange
    The default value for this field is determined from the window where it was launched or in Settings.
Instrument
    This field is filtered to display valid instruments based on the exchange that is selected.

TABLE 11-continued

Contract Date
    This field is filtered to display valid contract dates based on the instrument that is selected.
Order Type
    This field is filtered to display valid order types based on the exchange that is selected.
Limit Price
    This field defaults to either the current bid, ask or last as determined by Settings and by the side.
    This price does not change once the order is open.
    This field is enabled only for stop, stop limit, MIT orders and the synthetic equivalents for those order types.
    The user is able to enter the price via keyboard entry or spinner.
Order Quantity
    The user is able to change the specified order quantity through a key-pad control. Each key-pad input increases the specified quantity by the amount displayed on the key (the key value).
    The user has ability to set the quantity back to zero.
    The user is able to select to have the specified quantity set to zero after order entry.
Secondary Price
    This field is enabled only for stop limit orders.
Good-Till-Date
    This field is enabled only for orders with TIF (Time in Force) of GTD.
    This field defaults to the current trade date.
    This window allows the user to view and print reports.
Screen Access
    This window is accessed via the Manager window. Multiple report windows cannot be launched. The report window is not a member of any Desktop Layout.
Functional Requirements
    No trading functionality is available from this window.
Fill Report
    The user is able to view and print a fill report by account for the current day.
    The data for this report is saved on the client.
Order History Report
    The user is able to view and print an order history report for the current day or for any range of time up to 30 days.
    History includes parked orders.
    The data for this report should is on the client machine 30.
Orders Entered Report
    The user is able to view a report showing orders entered that were filled for the current day or for any range of time up to 30 days.
    The data for this report is saved on the client.

Client Logs

This functionality allows the user to send error and audit logs. A log of application errors is maintained. Application error logs, created daily, are retained for ten trading days. The user does not have ability to view the application error log. Logs are stored on the client and are not be encrypted, but should not be easily accessible to the user. The user can send the application error log to another location from within the application 30.

An audit log is created. The audit log contains detailed order history, including all available times associated with the order. The log also contains fills associated with the order. The log contains messages pertaining to the application which indicate connection activities and statuses. Audit logs, created daily, are retained for ten trading days. The user does not have ability to view the audit log. Logs are stored on the application 30 and should not be encrypted, but should not be easily accessible to the user. The user can send the audit log to another location from within the network 18.

Specialized Order Functionality

The application 30 also provides specialized order functionality. This functionality is available to the user wherever orders can be entered. The user creates one-cancels-other (OCO) order pairs. An OCO order is one that allows the user to have two working orders in the market at once With the execution of one order the other is canceled. The user can construct an OCO pair across different instruments traded on a single electronic exchange. The user can construct an OCO pair across different instruments on two electronic trading exchanges. The user can construct an OCO pair combining orders of any order type that is supported by the exchange (or supported synthetic order types).

The user cancels OCO orders before exiting the application 30. If the user has any open OCO's upon logoff, the GUI 32 warns the user that the orders will be cancelled and allow the user to cancel the logoff if desired. By default, entering a quantity for the OCO enters that same quantity for both sides of the OCO.

A complete fill of one order cancels the other order. If there is a partial fill on one leg of the OCO, the other side of the OCO is reduced by the amount that was filled. This functionality will only occur if both legs of the OCO are entered with the same quantity. The user has the ability to turn off this functionality, so that the order quantities don't automatically decrement and the orders are canceled only when one order is completely filled. If the user enters different quantities, this functionality are automatically turned off and disabled.

The user can cancel individual orders of the pair, leaving the remaining order in the market. The user can cancel both orders in the pair simultaneously. The user can change the price for an individual order of the pair. The user can create a profit/loss bracket order pair. A Profit/Loss bracket is a specific case of an OCO order pair. This order pair consists of a limit order to establish a profit and a stop loss order to limit loss. The stop loss portion of the bracket should be able to be a "trailing stop." The use is able to create a profit/loss bracket around an existing position. The user is able to create a profit/loss bracket around a fill. The use can create a profit/loss bracket around an order in the filled state.

The user can create trailing stop orders. A trailing stop is an order that tracks a price of the instrument and adjusts the stop trigger price in accordance with a predefined rule (i.e., stop trigger is changed when the market changes a certain number of ticks).

Trailing stop orders can be either of type stop or stop limit. For stop limit orders, the limit price will be changed such that it keeps the same differential from the stop trigger price. In order to set up the trailing stop rule, the user must enter: the number of ticks that the market must change before the stop trigger price should be adjusted. The number of ticks that the stop trigger price should be adjusted when an adjustment is warranted. A trailing stop order is purely synthetic.

The stop order should only be known to the client until it is actually triggered. At that time either a market order (in the case of an order type of stop) or a limit order (in the case of a stop limit order) will be entered into the market. A trailing stop only adjusts the stop trigger price in the profitable direction of the trade. A trailing stop order to sell does not adjust the stop trigger price to a value less than the initial trigger value. A trailing stop order to sell only increases the stop trigger price. A trailing stop order to sell only adjusts the stop trigger price when new high prices are traded in the instrument. This will prevent adjusting the stop trigger price if the instrument price retraces a profitable move but does not trigger the stop.

A trailing stop order to buy does not adjust the trigger price to a value greater than the initial trigger value. A trailing stop order to buy only decreases the stop price. A trailing stop order to buy must adjusts the trigger price when new low prices are traded in the instrument. This will prevent adjusting the stop trigger price if the instrument price retraces a profitable move but does not trigger the stop. Trailing stops are only valid while the user is logged into the application 30. Application 30 exit will have the effect of the trailing stop not being in the market. On application exit, if the user has trailing stops entered, the user will be warned that the stop will not be worked while the application is closed.

The user is to choose to save trailing stops. On application 30 launch, the user is advised of any saved trailing stops and given the opportunity to reenter them.

The user is able to create parked orders. A parked order is an order that is created by the user but not submitted to the market. The user is able to release a parked order. Releasing a parked order submits it to the market. The user can change a working order to a parked order. This sends a cancel to the exchange. On receipt of the cancel acknowledgement, the application 30 changes the order state to indicate that the order is parked. Parked orders are saved on application exit. Parked orders are restored on application 30 launch.

If-Then Strategies

The user can create an "If-Then Strategy." With an If Then Strategy, an order is entered into the market. Upon receipt of a fill acknowledgement for the order, one or more other orders are automatically entered by the application 30 based on the If-Then strategy. Typically, the orders that are entered with If-Then Strategy will be orders to manage profit and loss expectations for the fill that was received on the original order. The user can create an If-Then strategy where on the receipt of the acknowledgement of an order fill, a profit/loss bracket is entered around the fill price for the filled quantity.

The user can create an If-Then strategy where on the receipt of the acknowledgement of an order fill, a stop or stop limit order is entered at an offset from the fill price for the quantity of the fill. The user can create an If-Then strategy where on the receipt of the acknowledgement of an order fill, a trailing stop order is entered at an offset from the fill price for the quantity of the fill. The user can create an If-Then strategy where on the receipt of the acknowledgement of an order fill, a limit order is entered at an offset from the fill price for the quantity of the fill. The user can create an If-Then strategy where on the receipt of the acknowledgement of an order fill, an OCO order pair is entered.

FIG. 15 is a flow diagram illustrating a Method 88 for electronic trading. At Step 90, one or more sets of If-Then electronic trading strategy information is obtained on an aggregate book view window 66 on a application 30 on a target device to automatically execute one or more electronic trades on one or more electronic trading exchanges. At Step 92, one or more sets of electronic trading information are continuously received on the application 30 from one or more electronic trading exchanges 20, 22. At Step 94, the one or more sets of electronic trading information are displayed via application 30 on the ABV window 66. At Step 96, one or more electronic trades are automatically electronically executed via application 30 on an appropriate electronic trading exchange 20, 22 using the one or more sets of If-Then electronic trading strategies. At Step 98, results from any automatic execution of any electronic trade are formatted and displayed on the ABV window.

Collective Graphical Windows

FIG. 16 is a flow diagram illustrating a Method 100 for manipulating multiple windows. At Step 102, two or more graphical windows displayed by application 30 are selected from plural graphical windows (e.g., 46, 48, 50 56, 58, 60, 62, 64, 66, 84, 86) displayed by an application 30 on a graphical user interface (GUI) 32 of a target device 12, 14, 16. The plural graphical windows are used for electronic trading. At Step 104, the selected two or more individual graphical windows are moved on the GUI 32 so a portion of each of the selected two or more graphical windows touch. At Step 106, a collective window is presented by the application 30 including the touching two or more selected graphical windows. At Step 108, the collective window is selected, thereby allowing the collective window including the selected two or more individual graphical windows to be moved around the GUI 32 of the target device 12, 14, 16.

Method 100 is illustrated with an illustrative embodiment. However, the invention is not limited to this exemplary embodiment and other embodiments can also be used to practice the invention.

In such an exemplary embodiment at Step 102, two or more graphical windows are selected (e.g., with a mouse click, key press, stylus touch, etc.) from plural graphical windows (e.g., 46, 48, 50 56, 58, 60, 62, 64, 66, 84, 86, etc.) displayed by the application 30 on a graphical user interface (GUI) 32 of a target device 12, 14, 16. The plural windows are used to complete various tasks for electronic trading such as entering orders for cash, futures, stocks, commodities and other electronic trading market place tracking market prices and movements and other tasks such as viewing e-mail, connecting to the Internet or other communications networks, etc. Electronic traders typically configure and personalize their own GUI 32 with various size and shaped windows depending on user preferences and type of electronic trading being completed.

The plural windows are various sizes and shapes as created and sized by a user of the target device 12. The windows can be any size or shape allowed by the Application 30.

FIG. 17 is a block diagram of a screen shoot 110 illustrating plural individual graphical windows 112, 114, 116, 118, 120 displayed on the GUI 32. None of the plural windows are not touching each other in FIG. 17. The plural windows are illustrating as generic windows for simplicity, but can include any of the graphical windows (e.g., 46, 48, 50 56, 58, 60, 62, 64, 66, 84, 86, etc.) described above.

At Step 104, the selected two or more individual graphical windows are moved on the GUI 32 so a portion of each of the selected two or more graphical windows touch. At Step 106, the selected two or more individual graphical windows 112, 114, 116, 118, 120 are selected with a mouse, keyboard or other selection device (e.g., stylus, etc.) and moved so the two or more plural windows touch each other on the GUI 32.

In one embodiment, a user of the target device 12, 14, 16 can connect two independent windows by selecting a window title bar (e.g., with a left button mouse click) and dragging the window until any two window boarders touch. Once the selection (e.g., left mouse button) is released, the two previously disconnected windows will act as a single window collective. This collective window can be moved as a group with a selection (e.g., right mouse button click) and drag on any window title bar. However, the present invention is not limited to this embodiment and other embodiments and other selection inputs and portions of the windows can be used to practice the invention.

At Step 108, a collective window 124 is received including the touching two or more selected graphical windows.

Figure 18:
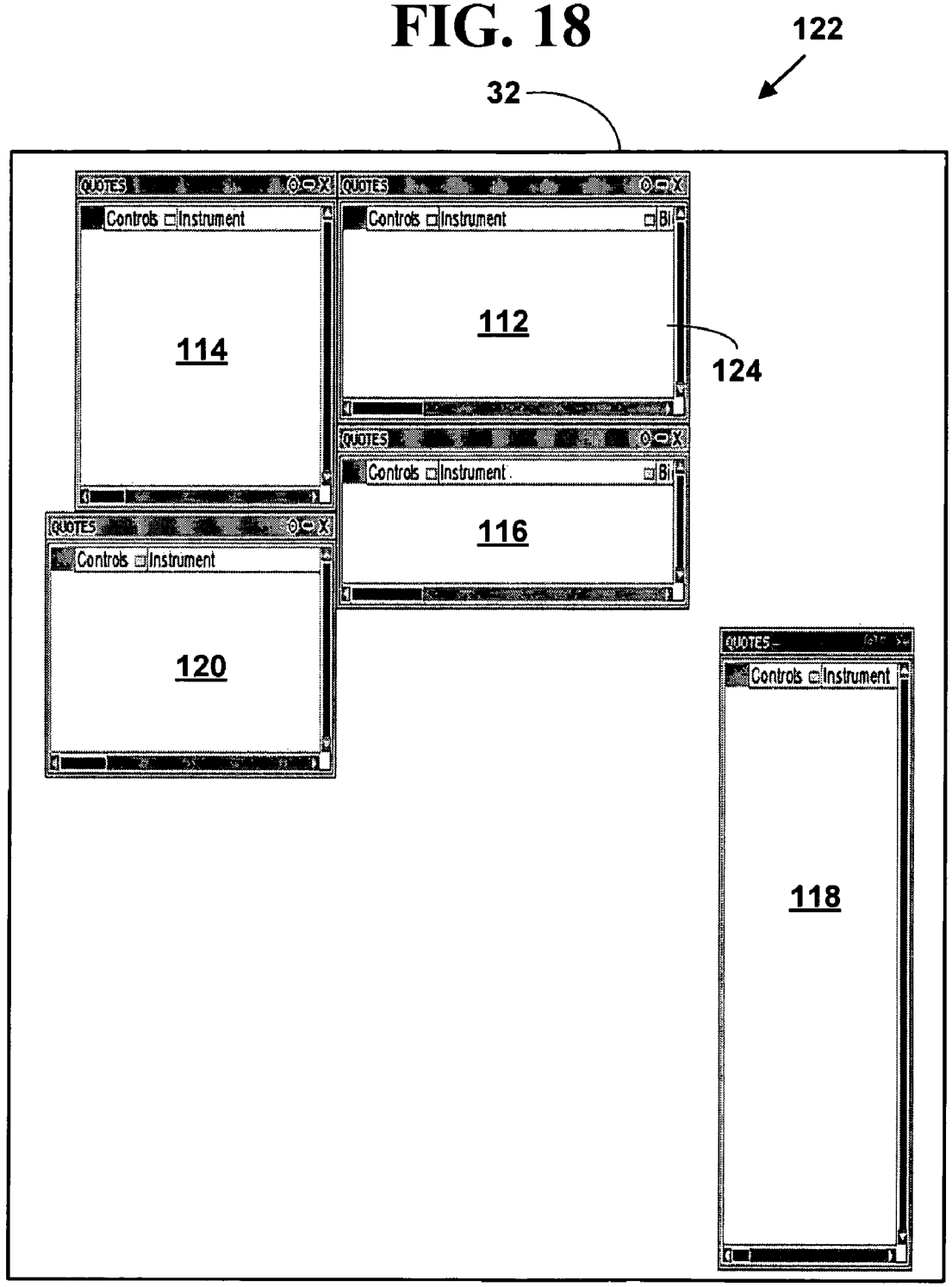
FIG. 18 is a block diagram of a screen shot illustrating one or more of the plural windows are moved so the one or more plural windows touch each other to create a collective window.

FIG. 18 is a block diagram of a screen shot 122 illustrating one or more of the plural windows 112, 114, 116, 118, 130 are moved so the one or more plural windows touch each other to create a collective window 124. The collective window 124 is illustrated as an irregular size and shape. However, once the collective window 124 is created, it can be re-sized and re-shaped as a unit depending on preferences of as user. The resulting size and shape are controlled by the application 30.

At Step 108, the collective window 124 is selected, thereby allowing the collective window including the selected two or more individual graphical windows to be moved around the GUI of the target device.

Figure 19:
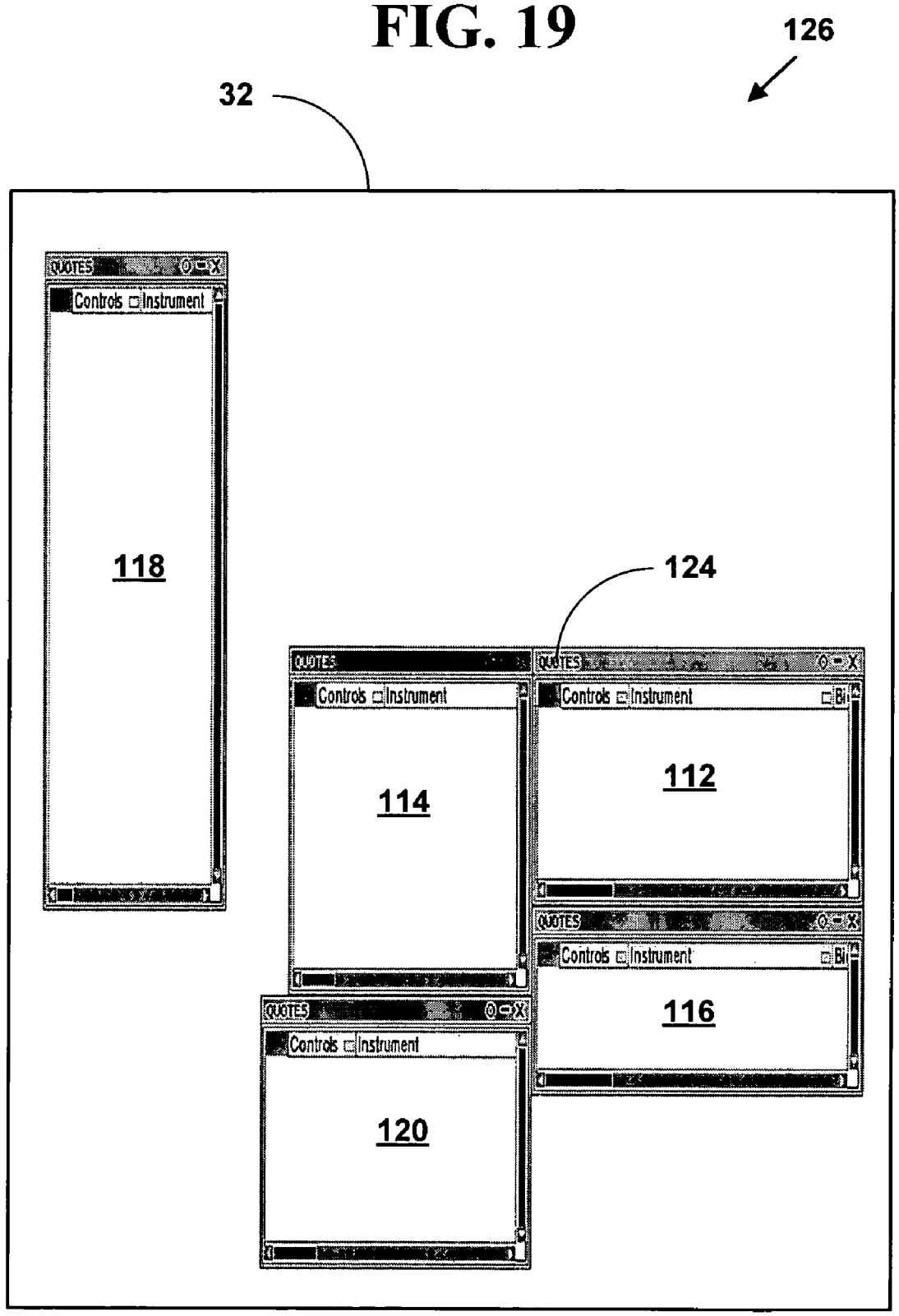
FIG. 19 is a block diagram of a screen shoot illustrating plural windows of a collective window moved to another part of the display on the graphical user interface.

FIG. 19 is a block diagram of a screen shoot 126 illustrating plural windows 112, 114, 116, 118, 120 of a collective window 124 moved to another part of the display on the GUI 32.

One or more the individual windows 112, 114, 116, 118, 120 from the collective window 124 can be detached to again function as an individual window. Application 30 detaches individual windows from the collective window 124. Individual windows can be attached and detached via application 30 by selecting the individual window.

Figure 20:
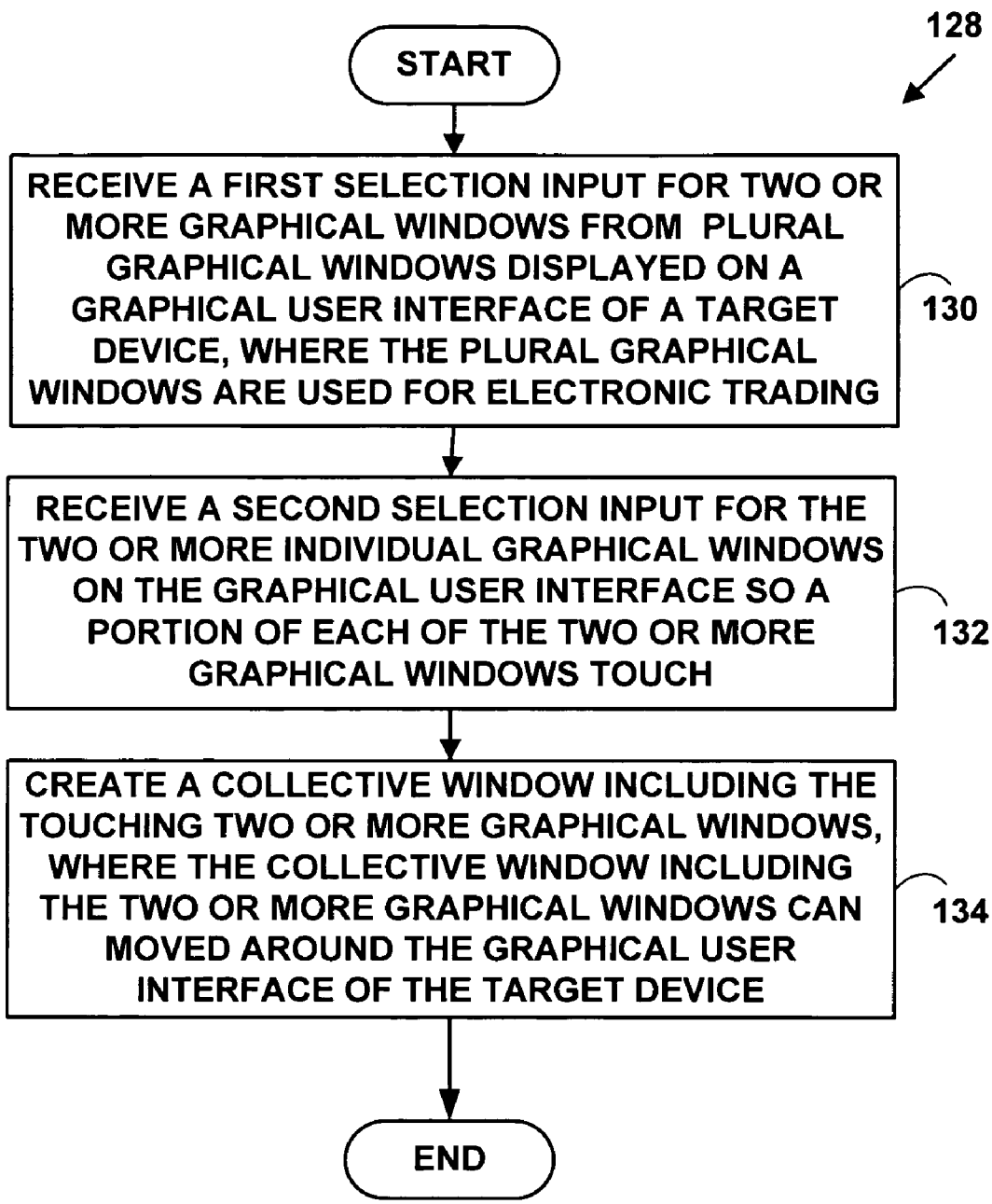
FIG. 20 is a flow diagram illustrating a method for manipulating multiple windows.

FIG. 20 is a flow diagram illustrating a Method 128 for manipulating multiple windows. At Step 130, a first selection input is received on the application for two or more graphical windows from plural graphical windows displayed on a graphical user interface (GUI) 32 of a target device 12, 14, 16. The plural graphical windows are used for electronic trading. At Step 132, a second selection input is received on the application for the two or more individual graphical windows on the GUI 32 so a portion of each of the two or more graphical windows touch. At Step 134, a collective window 124 is created by the application 30 including the touching two or more graphical windows. The collective window 124 including the two or more graphical windows can moved around the graphical user interface (GUI) 32 of the target device 12, 14, 16.

Method 128 is illustrated with an illustrative embodiment. However, the invention is not limited to this exemplary embodiment and other embodiments can also be used to practice the invention.

In such an exemplary embodiment, at Step 130, a first selection input (e.g., mouse click, key press, stylus touch, etc.) is received on application 30 for two or more graphical windows (e.g., 46, 48, 50 56, 58, 60, 62, 64, 66, 84, 86, etc.) illustrated as 112, 114, 116, 118, 120 in FIG. 17) from plural graphical windows displayed on a graphical user interface (GUI) 32 of a target device 12, 14, 16.

At Step 132, a second selection input (e.g., mouse click, key press, stylus select, etc.) is received on the application 30 for the two or more individual graphical windows (112, 114, 116, 120) on the GUI 32 so a portion of each of the two or more graphical windows touch.

In one embodiment, a user of the target device 12, 14, 16 can connect two independent windows by selecting a window title bar (e.g., with a left button mouse click) and dragging the window until any two window boarders touch. Once the selection (e.g., left mouse button) is released, the two previously disconnected windows will act as a single window collective. This collective window 124 can be moved as a group with a selection (e.g., right mouse button click) and drag on any window title bar. However, the present invention is not limited to this embodiment and other embodiments and selection inputs and portions of the windows can be used to practice the invention.

At Step 134, a collective window 124 is created by the application 30 including the touching two or more graphical windows 112, 114, 116, 120. The collective window 124 including the two or more graphical windows can moved around the graphical user interface (GUI) 32 of the target device 12, 14, 16 and resized as was described above.

Minimizing Plural Graphical Windows Simultaneously

Figure 21:
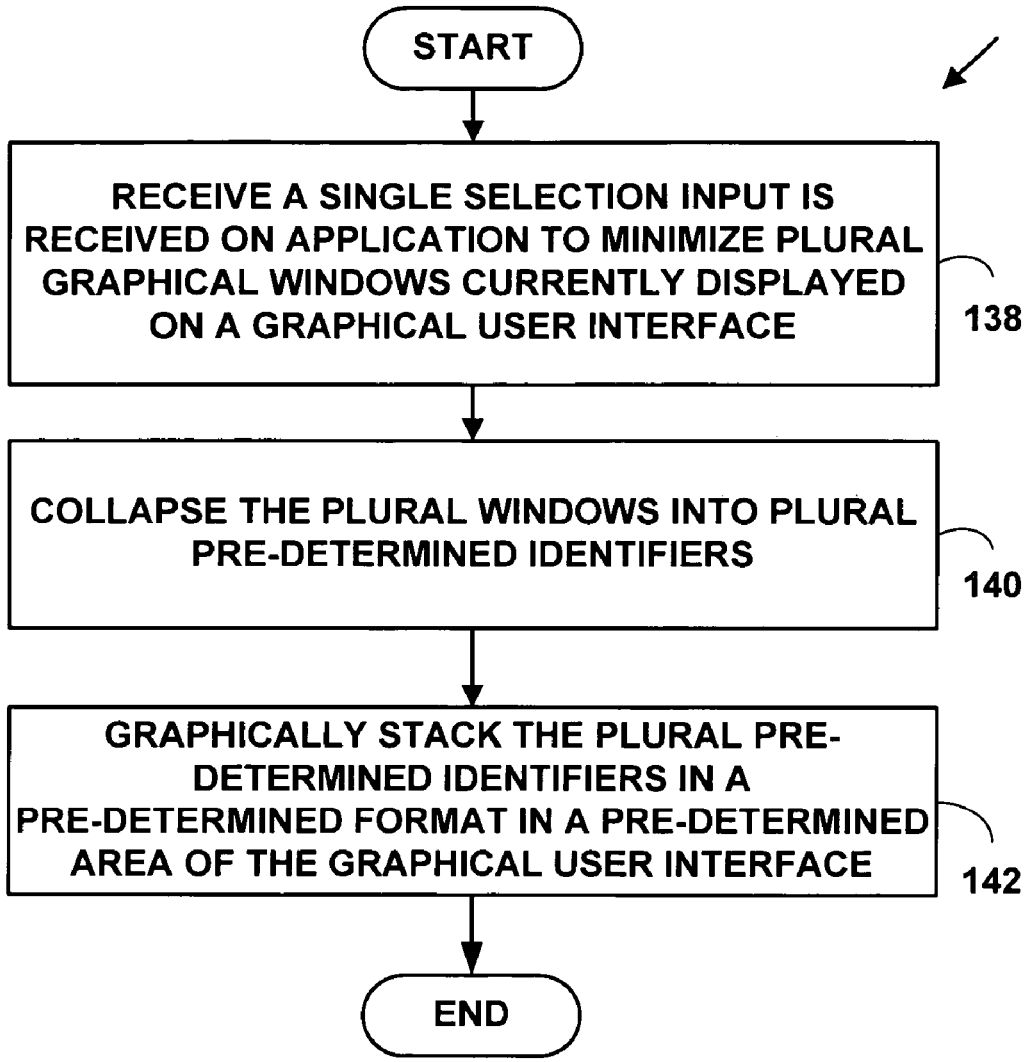
FIG. 21 is a flow diagram illustrating a method for manipulating multiple windows.

FIG. 21 is a flow diagram illustrating a Method 136 for manipulating plural windows. At Step 138, a single selection input is received on application 30 to minimize plural graphical windows currently displayed on a graphical user interface GUI 32. The plural graphical windows are used for electronic trading. At Step 140, the plural windows are collapsed by the application 30 into plural pre-determined identifiers. At Step 142, the plural pre-determined identifiers are graphically stacked in a pre-determined format in a pre-determined area of the GUI 32.

Method 136 is illustrated with an illustrative embodiment. However, the invention is not limited to this exemplary embodiment and other embodiments can also be used to practice the invention.

In such an exemplary embodiment at Step 138, a single selection input (e.g., mouse click, key press, stylus touch, etc.) is received on application 30 to minimize plural windows (e.g., 48, 50 56, 58, 60, 62, 64, 66, 84, 86, etc.) or a collective window 124 displayed on the GUI 32.

In one embodiment, the plural windows are minimized into a tools window 46. However, the present invention is not limited to such an embodiments, and other embodiments and other windows can or pre-determined areas can be used to practice the invention.

In one embodiment, the pre-determined identifier includes window title bar with a title (e.g., Order Window 50, ABV window 66, etc.) for a window. The title is used to identify the window for a user of the target device 12, 14, 16. However, the present invention is not limited to such an embodiment and other pre-determined identifiers and other embodiments can also be used to practice the invention.

Figure 22:
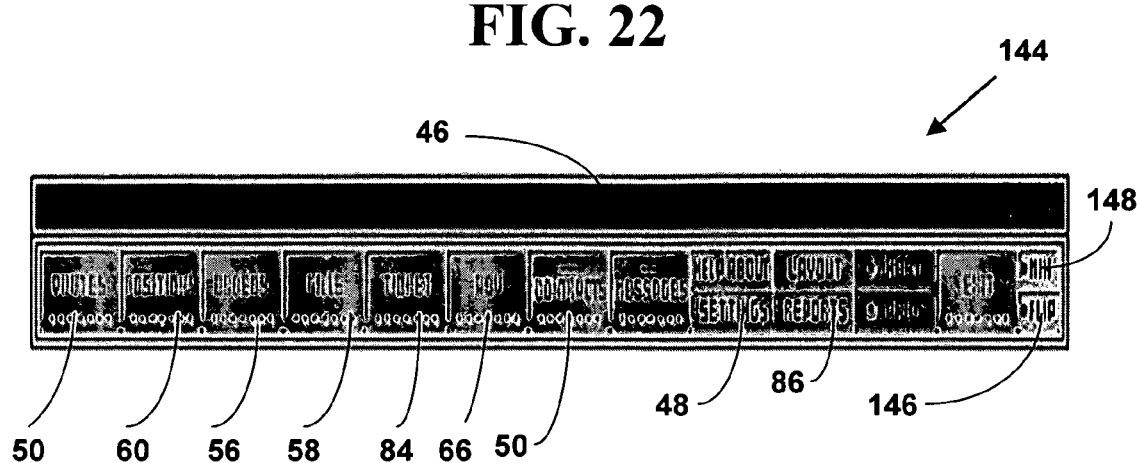
FIG. 22 is a block diagram of a screen shoot illustrating plural collapsed windows displayed horizontally on the graphical user interface.
Figure 23:
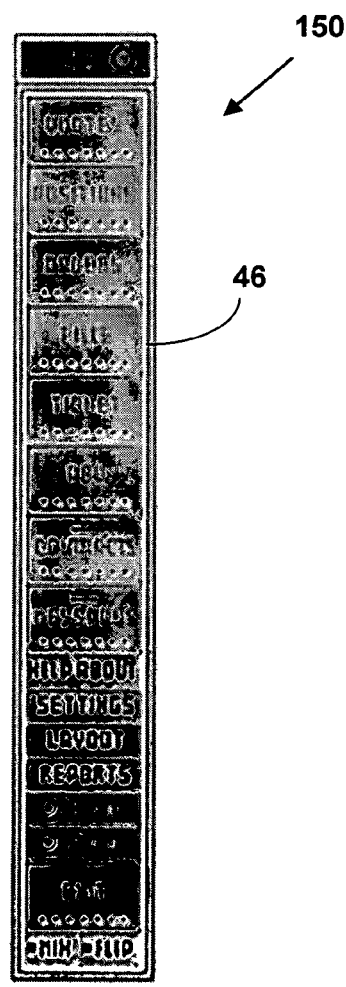
FIG. 23 is a block diagram of a screen shoot illustrating plural collapsed windows displayed vertically on the graphical user interface.

In one embodiment, the collapsed plural title bars are stacked vertically showing their titles (FIG. 23). In another embodiment the collapsed plural title bars are stacked horizontally (FIG. 22).

Any individual window can be restored to its pre-minimized state by clicking a graphical restore control area on their title bar. All windows may be restored to their pre-minimized state by clicking a graphical restore button on the main application 30 toolbar displayed 32 on the GUI 32.

FIG. 22 is a block diagram of a screen shoot 144 illustrating plural collapsed windows 50, 56, 58, 60, 66, 84 displayed horizontally on the GUI 32 after selection with Method 136. A toolbar window 46 for the plural collapsed windows includes a graphical flip button 146 that allows the orientation to be flipped from horizontal to vertical. The toolbar window 46 also includes a minimize button 148 for minimizing the toolbar window 46 including the plural collapsed windows.

FIG. 23 is a block diagram of a screen shoot 150 illustrating plural collapsed windows displayed vertically on the GUI 32 after selection with Method 136.

A user on the target device 12 can change the horizontal/vertical orientation of the tools window 26 by clicking a flip button 134 on the tools window 46. Repeatedly clicking the flip button 146 will toggle the orientation between horizontal 144 and vertical 150.

Figure 24:
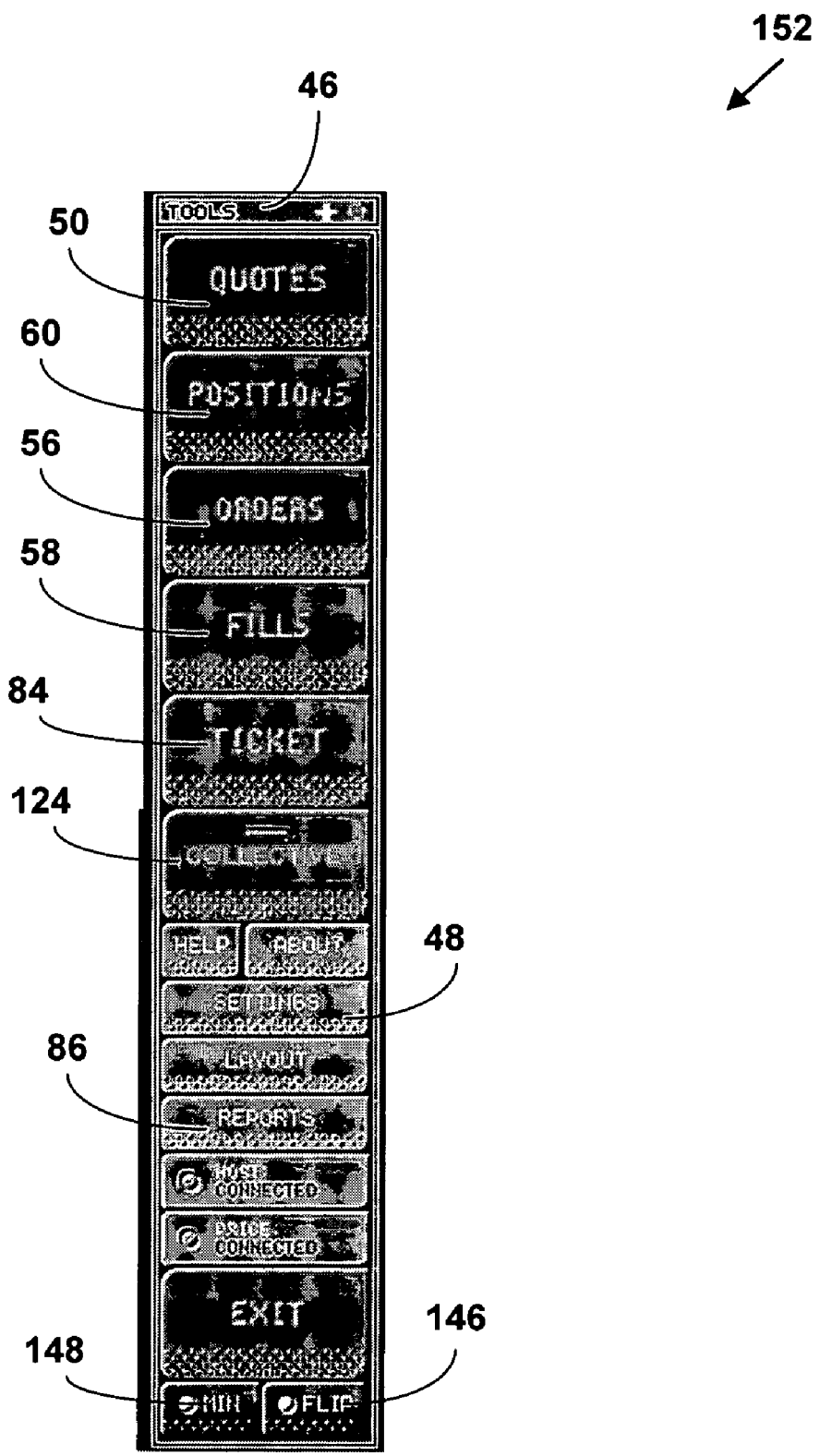
FIG. 24 is a block diagram of screen shot illustrating another view of other plural collapsed windows displayed vertically on the graphical user interface.

FIG. 24 is a block diagram of screen shot 152 illustrating another view of other plural collapsed windows 50, 60, 56, 58, 64, 124 displayed vertically on the GUI 32 after selection with Method 136.

Changing Characteristics of a Graphical Window

Figure 25:
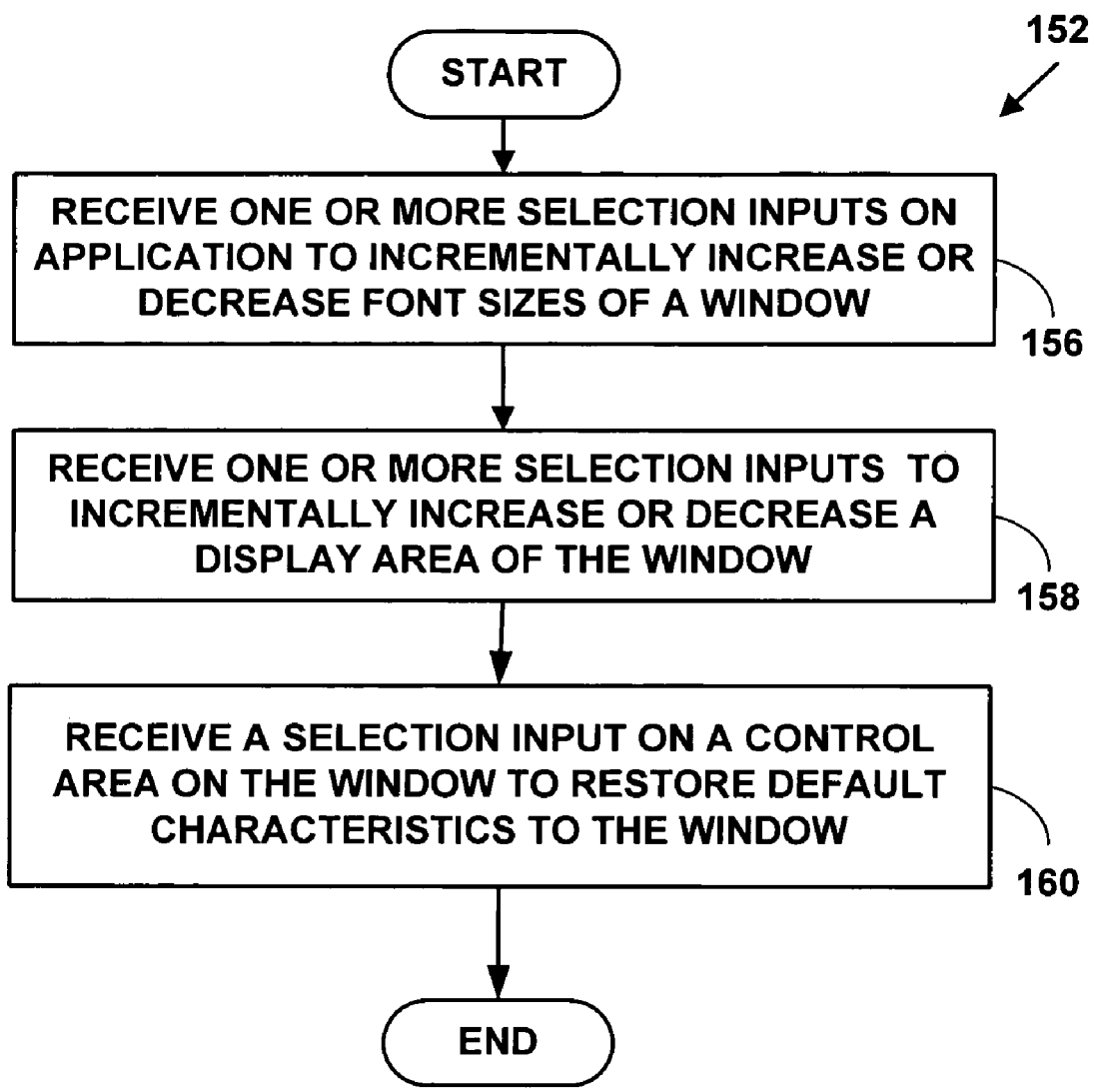
FIG. 25 is a flow diagram illustrating a method for changing the characteristics of a window.

FIG. 25 is a flow diagram illustrating a Method 154 for changing the characteristics of a graphical window. At Step 156, one or more selection inputs are received on application 30 to incrementally increase or decrease font sizes of a graphical window. At Step 158, one or more selection inputs are received to incrementally increase or decrease a display area of the graphical window. At Step 160, a selection input is received on a control area on the window to restore default characteristics to the graphical window.

Method 154 is illustrated with an illustrative embodiment. However, the invention is not limited to this exemplary embodiment and other embodiments can also be used to practice the invention.

In such an exemplary embodiment at Step 156, one or more selection inputs (e.g., mouse clicks, key presses, stylus touches, etc.) are received on application 30 incrementally increase or decrease fonts sizes of an exemplary Quotes window 50.

Figure 26:
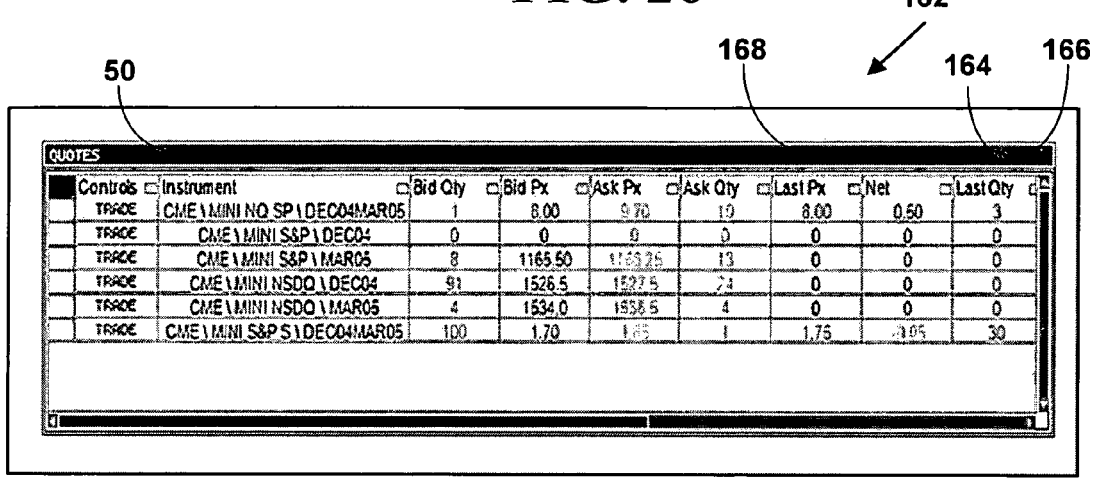
FIG. 26 is a block diagram of a screen shot illustrating an exemplary Quotes window.

FIG. 26 is a block diagram of a screen shot 162 illustrating an exemplary Quotes window 50 with a circle indicator 164, a minus indicator 166 displayed in a window control area 168 of a window title bar.

In one embodiment, selecting the circle indicator 164 incrementally increases a font size displayed in a window. Selecting the minus indicator 166 incrementally decreases a font size displayed in a window. However, the present invention is not limited to such an embodiment and other embodiments and other graphical indicators can also be used to practice the invention.

At Step 158, one or more selection inputs are received to incrementally increase or decrease a display area of a window.

Figure 27:
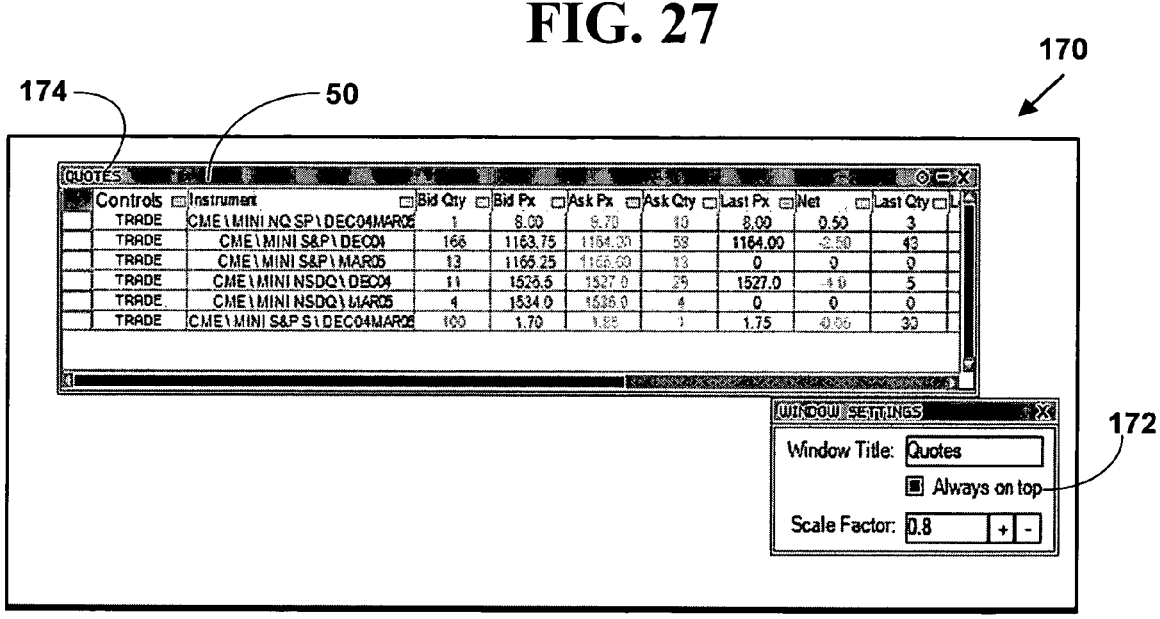
FIG. 27 is a block diagram of a screen shot illustrating a window reduced in size of display area.

FIG. 27 is a block diagram of a screen shot 170 illustrating a window reduced in size of display area by a scale factor of (0.8) via a dialog box 172 with a window control area 174.

Figure 28:
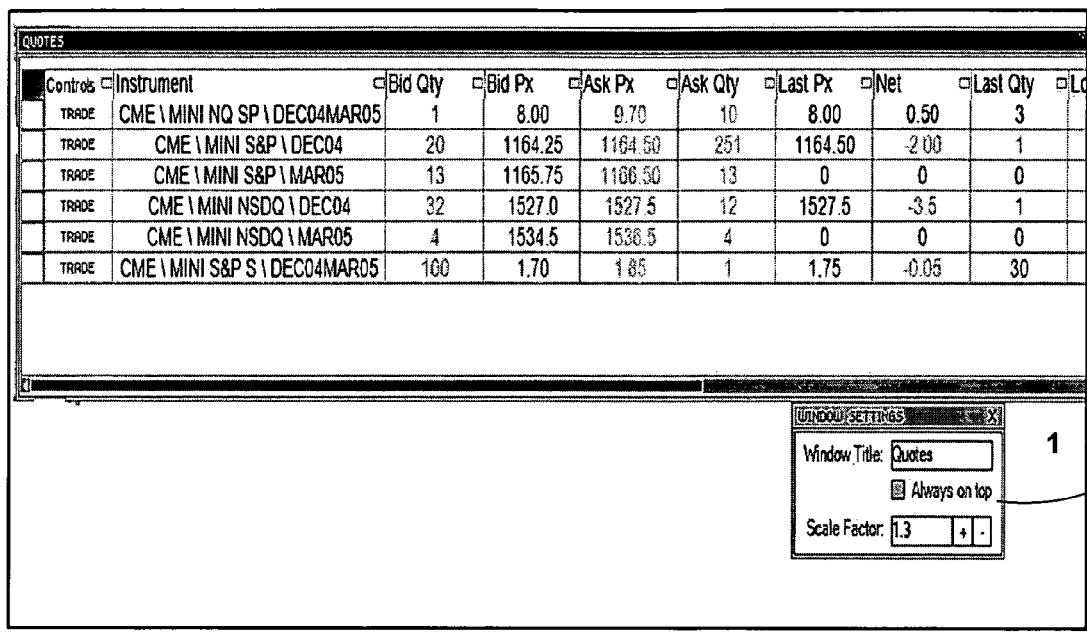
FIG. 28 is a block diagram of a screen shot illustrating a window increased in size of a display area.

FIG. 28 is a block diagram of a screen shot 176 illustrating a window increased in size of a display area by a scale face of (1.3) via a dialog box 178.

In one embodiment, if the control area 168 is selected twice (e.g., doubled clicked with a mouse, etc.), a dialog box 172 appears that allows a user to input a scale factor (e.g., 0.80 for a reduction in size to 80% of the original size) to increase or decrease a display area of a window.

If the control area 168 is selected once (e.g., single click with a mouse, etc.), each successive selection incrementally increases or decreases the display area of the window. For example, a user may select a direction first (e.g., with a right mouse click, etc.) and then uses other selection inputs (e.g., left mouse clicks, etc.) for incrementally increasing or decreasing a display areas.

In one exemplary embodiment, the font sizes, font size increments, scale factors and other parameters are set via the Settings window 48. However, the present invention is not limited to such an embodiment, other embodiments can also be used to practice the invention.

In one embodiment, a user can select via a single action (e.g., mouse click, key press, stylus touch, etc.) a title area 174 (e.g., Quotes, etc.) of control area 170 on enlarged or reduced display area window or altered font size window and return it to its original state.

Method 154 has been illustrated with regular window (i.e., a non-cumulative window). However, method 142 can also be used on cumulative windows 124.

Figure 29:
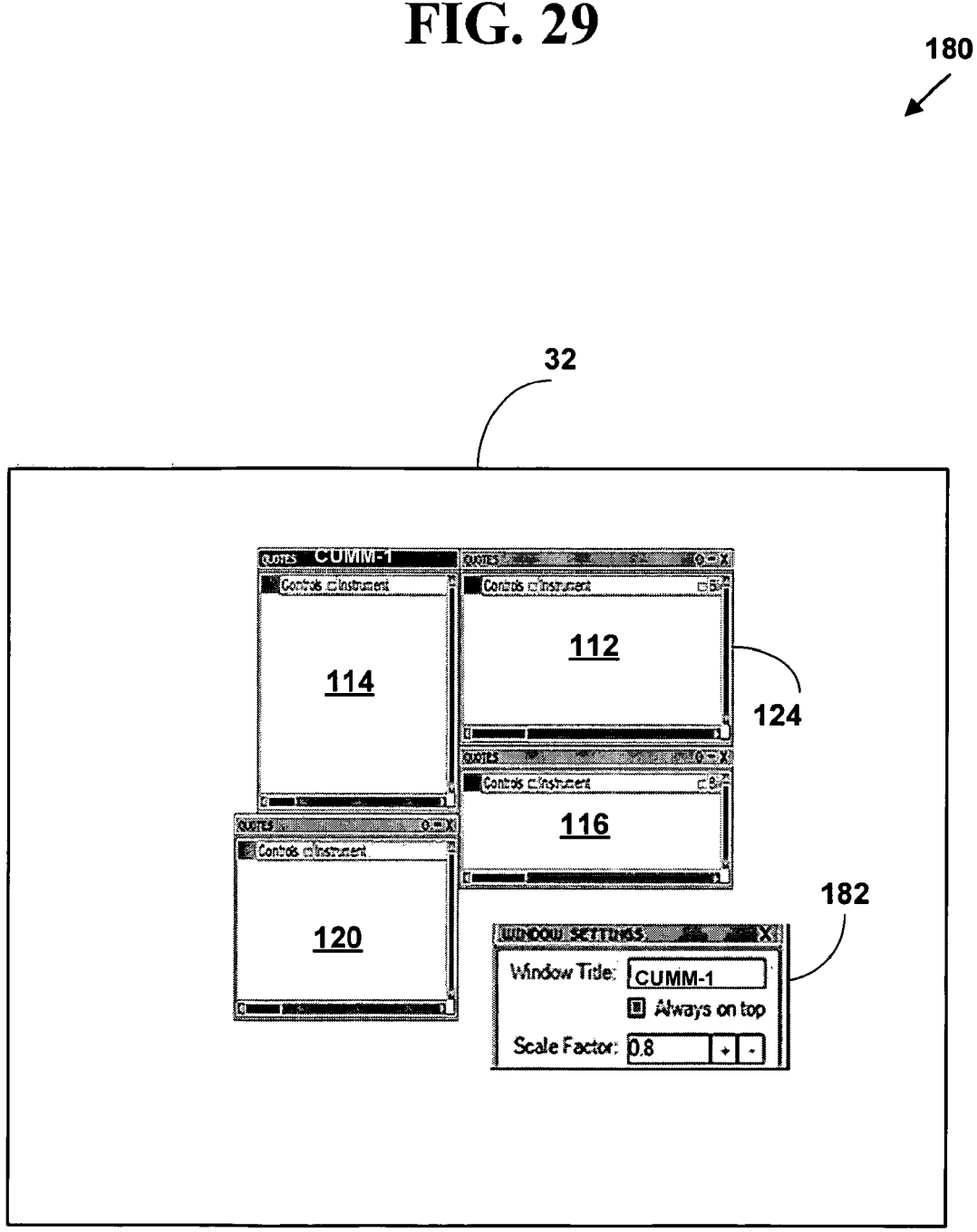
FIG. 29 is a block diagram of a screen shot 168 illustrating a window increased in size of a display area of a cumulative window.

FIG. 29 is a block diagram of a screen shot 180 illustrating a window increased in size of a display area by a scale face of (1.3) of a cumulative window 124 via dialog box 182.

In embodiment, application 30 includes multiple software modules to implement the methods and systems described herein. In another embodiment, application 30 include multiple firmware or hardware modules or a combination thereof of firmware, hardware and/or software modules.

For the method and system described herein the configurable GUI features include, but are not limited to, creating collective windows comprising plural individual windows, where the collective window functions like an individual window, collapsing plural windows with a single action and changing display characteristics of the plural windows or the collective windows. The method and system allows a user of a target device to customize the multi-windowed GUI based on individual user preferences for electronic trading.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for creating a collective graphical window, comprising:
   receiving in real-time a plurality of pieces of electronic data from one or more electronic trading exchanges on an application on a target device with one or more processors via a communications network;
   receiving from the application a display of the plurality of pieces of electronic data in a plurality of graphical windows on a graphical user interface (GUI) used for electronic trading in real-time, wherein each of the plurality of graphical windows includes one or more specific types of trading functionality for electronic trading;
   selecting two or more individual graphical windows from the plurality graphical windows displayed by the application on the graphical user interface of the target device, wherein the plurality of graphical windows include varying shapes and sizes depending on a function provided for electronic trading and wherein a size and shape of an individual graphical window is selected specifically for displaying one or more pieces of electronic data used for electronic trading in one or more specific locations in a desired format in the individual graphical window based on trader preferences;
   moving the selected two or more individual graphical windows on the graphical user interface so a portion of each of the selected two or more individual graphical windows touch, thereby forming a collective window, wherein the collective window is formed whenever any portion of two or more individual graphical windows touch;
   receiving a collective window from the application including the touching two or more selected individual graphical windows, wherein the two or more individual graphical windows maintain an original size and shape in the collective window and wherein a resulting size and shape of the collective window reflects the original size and shape of the two or more individual graphical windows and actual locations where the two or more individual graphical windows touch and wherein retaining the original size and shape of the two or more individual graphical windows in the collective window retains displaying the one or more pieces of electronic data used for electronic trading in one or more specific locations in the desired format in the two or more individual graphical window based on trader preferences;
   selecting the collective window, thereby allowing the collective window including the two or more graphical windows to be moved around the graphical user interface of the target device and used for electronic trading and thereby providing a customized trading interface in the selected collected window with a desired set of graphical windows used for a desired type of electronic trading; and
   executing one or more electronic trades on one or more electronic trading exchanges via the application via the selected collective window for the desired type of electronic trading.

2. The method of claim 1 further comprising a computer readable medium having stored therein a plurality of instructions for causing one or more processors to execute the steps of the method.

3. The method of claim 1 wherein the plurality of graphical windows include a tools window, a settings window, a contracts and quotes window, an order window, a fill window, a position window, an aggregated book value or ask bid volume window, an order ticket window or a reports window.

4. The method of claim 1 wherein the plurality of graphical windows include a plurality of aggregated book value or ask bid volume (ABV) windows.

5. The method of claim 1 wherein the plurality of graphical windows include a plurality of order ticket windows.

6. The method of claim 1 wherein a size or a shape of the collective window is changeable.

7. The method of claim 1 wherein an individual graphical window can be attached or detached from the collective window.

8. The method of claim 1 wherein the step of selecting two or more graphical windows includes selecting with the two or more graphical windows with a mouse click, key press or stylus touch.

9. A method for manipulating multiple graphical windows, comprising:
   receiving in real-time a plurality of pieces of electronic data from one or more electronic trading exchanges on an application on a target device with one or more processors via a communications network;
   displaying with the application the plurality of pieces of electronic data in a plurality of graphical windows on a graphical user interface (GUI) used for electronic trading in real-time, wherein each of the plurality of graphical windows includes one or more specific types of trading functionality for electronic trading;
   receiving on the application a first selection input for two or more graphical windows from the plurality individual graphical windows displayed on the graphical user interface of the target device, wherein the plurality of graphical windows are used for electronic trading in real-time, wherein the plurality of graphical windows include varying shapes and sizes depending on a function provided for electronic trading and wherein a size and shape of an individual graphical window is selected specifically for displaying one or more pieces of electronic data used for electronic trading in one or more specific locations in a desired format in the individual graphical window based on trader preferences;
   receiving on the application a second selection input for the two or more individual graphical windows on the graphical user interface so a portion of each of the two or more graphical windows touch at any portion on the two or more individual graphical windows; and
   creating on the application the collective window including the touching two or more individual graphical windows, wherein the collective window includes the two or more individual graphical windows and can be moved around the graphical user interface of the target device,
   wherein the two or more individual graphical windows maintain an original size and shape in the collective window,
   wherein a resulting size and shape of the collective window reflects the original size and shape of the two or more individual graphical windows and actual locations where the two or more individual graphical windows touch in the collective window, wherein retaining the original size and shape of the two or more individual graphical windows in the collective window retains displaying the one or more pieces of electronic data used for electronic trading in one or more specific locations in the desired format in the two or more individual graphical window based on trader preferences, wherein the collective window including the plurality of graphical windows can be collapsed and restored wherein and original size and shape of the collective window, the original size and shape of the plurality of individual graphical windows in the collective window and actual locations where the plurality of individual graphical windows touch in the collective window are restored when the collective window is restored and wherein the collective window provides customized trading interface with a desired set of graphical windows used for a desired type of electronic trading;

displaying the collective window on the graphical user interface via the application;

receiving on the application a third selection input to select the displayed collective window for electronic trading; and receiving on the application a fourth selection input for executing one or more electronic trades on one or more electronic trading exchanges via the selected collective window for the desired type of electronic trading.

10. The method of claim 9 further comprising a computer readable medium having stored therein a plurality of instructions for causing one or more processors to execute the steps of the method.

11. The method of claim 9 wherein the plurality of individual graphical windows include a tools window, a settings window, a contracts and quotes window, an order window, a fill window, a position window, an aggregated book value or ask bid volume (ABV) window, an order ticket window or a reports window.

12. The method of claim 9 wherein the plurality of individual graphical windows include a plurality of aggregated book value or ask bid volume (ABV) windows.

13. The method of claim 9 wherein the plurality of individual graphical windows include a plurality of order ticket windows.

14. The method of claim 9 wherein a size or a shape of the collective window is changeable.

15. The method of claim 9 wherein the first selection input or the selection input includes selecting with the two or more graphical windows with a mouse click, key press or stylus touch.

16. The method of claim 9 further comprising:

receiving a single selection input on the application to minimize a plurality of individual graphical windows currently displayed on the graphical user interface in the collective window, wherein the plurality of individual graphical windows are used for electronic trading in real-time, wherein the plurality of individual graphical windows include varying shapes and sizes depending on a function provided for electronic trading, wherein the plurality of individual graphical windows form the collective window, wherein the plurality of individual graphical windows maintain an original size and shape in the collective window, wherein a shape of the collective window reflects the original size and shape of the plurality of individual graphical windows and actual locations where the plurality of graphical windows touch, wherein the collective window is formed whenever any portion of two or more individual graphical windows touch and wherein a size and shape of an individual graphical window in the collective window is selected specifically for displaying one or more pieces of electronic data used for electronic trading in one or more specific locations in a desired format in the individual graphical window based on trader preferences;

collapsing the collective window including the plurality of graphical windows into a plurality of pre-determined identifiers for the plurality of graphical windows;

graphically stacking the plurality of pre-determined identifiers in a pre-determined format in a pre-determined area of the graphical user interface; and receiving another single selection input on the application to restore the collective window, wherein an original size and shape of the collective window, an original size and shape of the plurality of individual graphical windows in the collective window and locations wherein the plurality of individual graphical windows touch in the collective window are restored to original locations on the graphical user interface.

17. The method of claim 16 further comprising a computer readable medium having stored therein a plurality of instructions for causing one or more processors to execute the steps of the method.

18. The method of claim 16 wherein the single selection input includes a mouse click, key press or stylus touch.

19. The method of claim 16 wherein the plurality of pre-determined identifiers include a plurality of title bars to uniquely identify individual windows in the plurality of graphical windows.

20. The method of claim 16 wherein the graphically stacking step includes graphically stacking the plurality of pre-determined identifiers in a vertical format or a horizontal format.

21. The method of claim 16 wherein the pre-determined area includes a tools window.

22. The method of claim 21 wherein the tools windows includes a graphical button for switching the tools window between a horizontal display orientation and a vertical display orientation.

23. The method of claim 16 wherein the plurality of individual graphical windows include a settings window, a contracts and quotes window, an order window, a fill window, a position window, an aggregated book value or ask bid volume (ABV) window, an order ticket window, a reports window.

24. The method of claim 9 further comprising:

receiving one or more selection inputs on the application to incrementally increase or decrease font sizes of the collective window used for electronic trading in real-time, wherein the collective window was formed from a plurality of individual graphical windows used for electronic trading in real-time, wherein the plurality of individual graphical windows maintain an original size and shape in the collective window, wherein a shape of the collective window reflects the original size and shape of the plurality of individual graphical windows and actual locations where the plurality of individual graphical windows touch, wherein the collective window is formed whenever any portion of two or more individual graphical windows touch and wherein a size and shape of an individual graphical window in the collective window is selected specifically for displaying one or more pieces of electronic data used for electronic trading in one or more specific locations in a desired format in the individual graphical window based on trader preferences;

receiving one or more selection inputs to incrementally increase or decrease a display area of the collective window; and receiving a selection input on a control area on the window to restore default characteristics to the collective window, wherein an original size and shape of the collective window, the original size and shape of the plurality of individual graphical windows in the collective window and actual locations where the plurality of individual graphical windows touch in the collective window are restored to an original location on the graphical user interface.

25. The method of claim 24 further comprising a computer readable medium having stored therein a plurality of instructions for causing one or more processors to execute the steps of the method.

26. The method of claim 24 wherein the selection inputs include a mouse click, key press or stylus touch.

27. The method of claim 24 wherein the individual graphical windows include a tools window, settings window, a contracts and quotes window, an order window, a fill window, a position window, an aggregated book value or ask bid volume (ABV) window, an order ticket window, and a reports window used for electronic trading.

28. A graphical window manipulation system with a plurality of means comprising computer readable medium having stored therein a plurality of instructions for causing one or more processors to execute the plurality instructions, comprising in combination:

means for receiving in real-time a plurality of nieces of electronic data from one or more electronic trading exchanges for displaying the plurality of pieces of electronic data in a plurality of graphical windows on a graphical user interface user for electronic trading in real-time, wherein each of the plurality of graphical windows includes one or more specific types of trading functionality for electronic trading and for executing one or more electronic trades on one or more electronic trading exchanges via a collective window;

means for creating the collective window wherein the collective window includes two or more individual graphical windows used for electronic trading, wherein the two or more individual graphical windows used for electronic trading in real-time include varying shapes and sizes depending on a function provided for electronic trading, wherein the two or more individual graphical windows maintain an original size and shape in the collective window and wherein a resulting size and shape of the collective window reflects the original size and shape of the two or more individual graphical windows and actual locations where the two or more individual graphical windows touch, wherein the collective window is formed whenever any portion of the two or more individual graphical windows touch and wherein a size and shape of an individual graphical window in the collective window is selected specifically for displaying one or more pieces of electronic data used for electronic trading in one or more specific locations in a desired format in the individual graphical window based on trader preferences;

means for receiving a single selection input to minimize a plurality of individual graphical windows currently displayed on a graphical user interface in the collective window, wherein the plurality of individual graphical windows are used for electronic trading, for collapsing the plurality of individual graphical windows in the collective window into a plurality of pre-determined identifiers for the plurality of individual graphical windows, for the collective window, for graphically stacking the plurality of pre-determined identifiers in a pre-determined format in a pre-determined area of the graphical user interface, for receiving a single selection input to restore the collective window, wherein an original size and shape of the collective window, an original size and shape of the plurality of individual graphical windows in the collective window and locations wherein the plurality of individual graphical windows touch in the collective window are restored to original locations on the graphical user interface; and means for receiving one or more selection inputs to incrementally increase or decrease font sizes of the collective window used for electronic trading, for receiving one or more selection inputs to incrementally increase or decrease a display area of the collective window, for receiving a selection input on a control area on the window to restore default characteristics to the collective window and for receiving a selection input on the pre-determined area of the graphical user interface to restore default characteristics to the collective window, wherein an original size and shape of the collective window, the original size and shape of the plurality of individual graphical windows in the collective window and actual locations where the plurality of individual graphical windows touch in the collective window is restored; and means for receiving a selection input for moving the collective window to a new desired location on the graphical user interface, thereby providing a customized trading interface in the collective window with a desired set of graphical windows used for a desired type of electronic trading, for receiving a selection input to select the collective window for electronic trading for receiving a selection input for executing one or more electronic trades on one or more electronic trading exchanges via the selected collective window for the desired type of electronic trading.

29. A graphical window manipulation system with a plurality of software modules comprising computer readable medium having stored therein a plurality of instructions for causing a target device with one or more processors to execute instructions, comprising in combination:

a software module for receiving in real-time a plurality of pieces of electronic data from one or more electronic trading exchanges, for displaying the plurality of pieces of electronic data in a plurality of graphical windows on a graphical user interface user for electronic trading in real-time, wherein each of the plurality of graphical windows includes one or more specific types of trading functionality for electronic trading and for executing one or more electronic trades on one or more electronic trading exchanges via a collective window;

a software module for creating the plurality of individual graphical windows on the graphical user interface used for electronic trading wherein the plurality of individual graphical windows include varying shapes and sizes depending on a function provided for electronic trading, wherein a size and shape of an individual graphical window in the collective window is selected specifically for displaying one or more pieces of electronic data used for electronic trading in one or more specific locations in a desired format in the individual graphical window based on trader preferences;

a software module for creating the collective window wherein the collective window includes two or more individual graphical windows, wherein the two or more individual graphical windows maintain an original size and shape in the collective window and wherein a resulting size and shape of the collective window reflects the original size and shape of the two or more individual graphical windows and actual locations where the two or more individual graphical windows touch, wherein the collective window is formed whenever any portion of the two or more individual graphical windows touch and wherein a size and shape of an individual graphical window in the collective window is selected specifically for displaying one or more pieces of electronic data used for electronic trading in one or more specific locations in a desired format in the individual graphical window based on trader preferences;

a software module for receiving a single selection input to minimize a plurality of individual graphical windows currently displayed on the graphical user interface in the collective window, for collapsing the plurality of individual graphical windows in the collective window into a plurality of pre-determined identifiers for the plurality of individual graphical windows and the collective window, for graphically stacking the plurality of pre-determined identifiers in a pre-determined format in a pre-determined area of the graphical user interface, and for receiving another single selection input to restore the collective window, wherein an original size and shape of the collective window, an original size and shape of the plurality of individual graphical windows in the collective window and locations wherein the plurality of individual graphical windows touch in the collective window are restored to original locations on the graphical user interface;

a software module for receiving one or more selection inputs to incrementally increase or decrease font sizes of the collective window, for receiving one or more selection inputs to incrementally increase or decrease a display area of the collective window, for receiving a selection input on a control area on the window to restore default characteristics to the collective window, and for receiving a selection input on the pre-determined area of the graphical user interface to restore default characteristics to the collective window, wherein an original size and shape of the collective window, the original size and shape of the plurality of individual graphical windows in the collective window and actual locations where the plurality of individual graphical windows touch in the collective window is restored; and a software module for receiving a selection input for moving the collective window to a new desired location on the graphical user interface, thereby providing a customized trading interface in the collective window with a desired set of graphical windows used for a desired type of electronic trading, for receiving a selection input to select the collective window for electronic trading for receiving a selection input for executing one or more electronic trades on one or more electronic trading exchanges via the selected collective window for the desired type of electronic trading.

* * * * *